(12) United States Patent
Matsui et al.

(10) Patent No.: US 12,095,118 B2
(45) Date of Patent: Sep. 17, 2024

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventors: Takaaki Matsui, Tokyo (JP); Kazuki Honda, Tokyo (JP); Rikako Imoto, Tokyo (JP); Hideki Nakai, Kyoto (JP); Takashi Sato, Tokyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 744 days.

(21) Appl. No.: 17/171,509

(22) Filed: Feb. 9, 2021

(65) Prior Publication Data
US 2021/0167470 A1 Jun. 3, 2021

Related U.S. Application Data

(63) Continuation of application No. PCT/JP2019/016146, filed on Apr. 15, 2019.

(30) Foreign Application Priority Data

Aug. 9, 2018 (JP) ................... 2018-150509

(51) Int. Cl.
*H01M 50/538* (2021.01)
*H01M 4/02* (2006.01)
(Continued)

(52) U.S. Cl.
CPC ......... *H01M 50/538* (2021.01); *H01M 4/133* (2013.01); *H01M 4/134* (2013.01);
(Continued)

(58) Field of Classification Search
CPC .................................................. H01M 50/538
See application file for complete search history.

(56) References Cited

U.S. PATENT DOCUMENTS

| 2011/0136008 A1* | 6/2011 | Hirose | H01M 10/0525 |
| | | | 252/182.1 |
| 2012/0316716 A1* | 12/2012 | Odani | H01M 10/0568 |
| | | | 429/188 |
| 2016/0133995 A1* | 5/2016 | Hattori | H01M 10/0587 |
| | | | 429/61 |

FOREIGN PATENT DOCUMENTS

| JP | 2006-164956 A | 6/2006 |
| JP | 2006-244834 A | 9/2006 |

(Continued)

OTHER PUBLICATIONS

International Search Report and Written Opinion issued in connection with PCT/JP2019/016146, mailed Jun. 11, 2019.

*Primary Examiner* — Maria Laios
*Assistant Examiner* — Jordan E Berresford
(74) *Attorney, Agent, or Firm* — K&L Gates LLP

(57) ABSTRACT

A secondary battery includes a wound electrode body. The wound electrode body includes a positive electrode, a negative electrode, and a separator. The positive electrode and the negative electrode are stacked on each other with the separator interposed therebetween and are wound about a winding axis. The wound electrode body has a section perpendicular to the winding axis. The section has an elongated shape that includes a flat part and a pair of curved parts. The curved parts oppose each other with the flat part interposed therebetween. The negative electrode includes a negative electrode current collector and a negative electrode active material layer provided on the negative electrode current collector. A width of the wound electrode body, a wound-layer number of the wound electrode body, and a ratio of a (Continued)

second distance to a first distance satisfy at least one of Condition A and Condition B.

17 Claims, 10 Drawing Sheets

(51) Int. Cl.
    *H01M 4/133*     (2010.01)
    *H01M 4/134*     (2010.01)
    *H01M 4/38*     (2006.01)
    *H01M 4/66*     (2006.01)
    *H01M 10/0525*     (2010.01)

(52) U.S. Cl.
    CPC ........... *H01M 4/386* (2013.01); *H01M 4/661* (2013.01); *H01M 10/0525* (2013.01); *H01M 2004/027* (2013.01); *H01M 2004/028* (2013.01); *H01M 2220/20* (2013.01)

(56) References Cited

FOREIGN PATENT DOCUMENTS

| | | | |
|---|---|---|---|
| JP | 2006244834 A | * | 9/2006 |
| JP | 2016-181409 A | | 10/2016 |
| JP | 2017-111878 A | | 6/2017 |
| WO | 2012/014422 A1 | | 2/2012 |

* cited by examiner

[ FIG. 10 ]
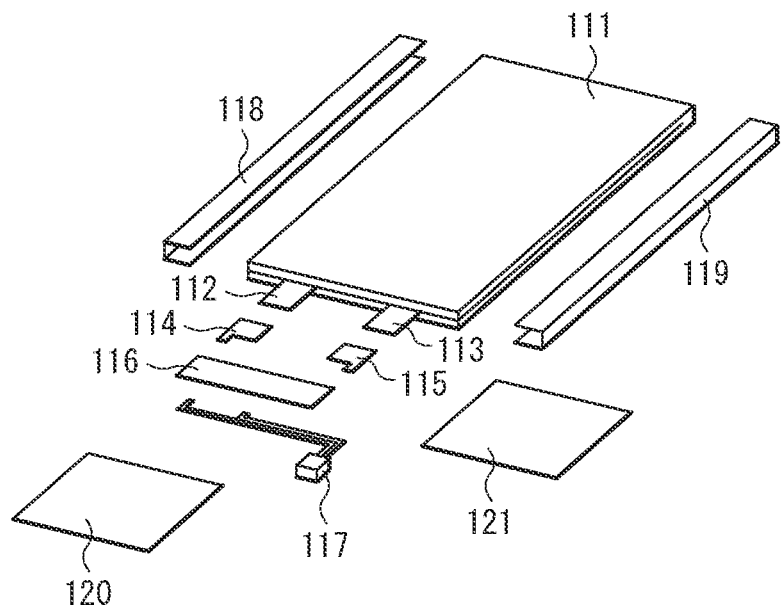
[ FIG. 11 ]
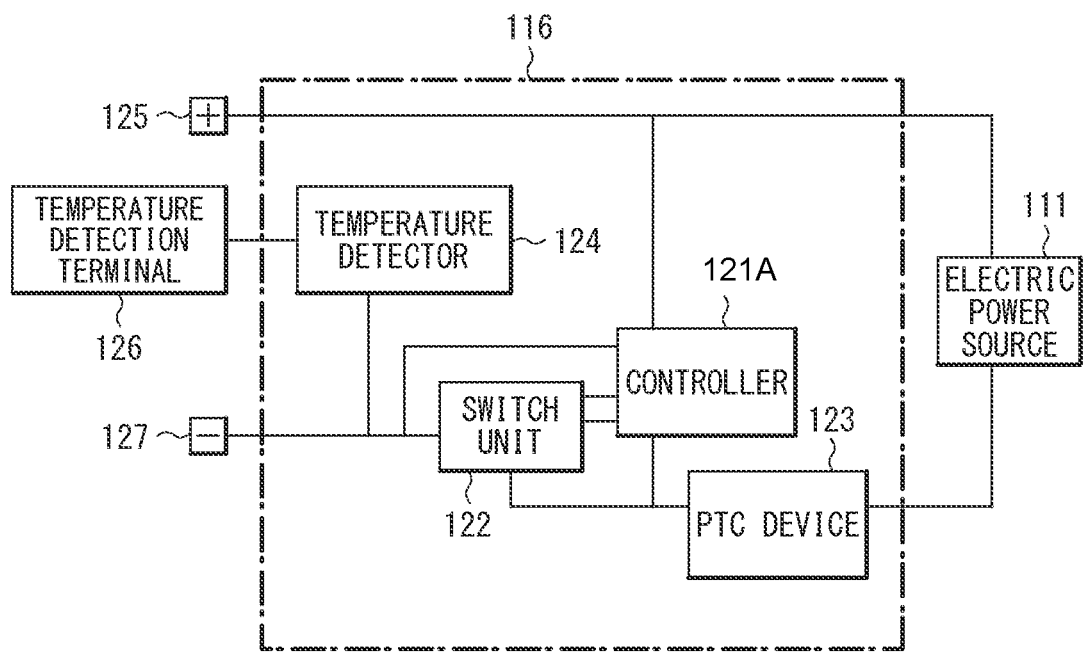

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

The present application is a continuation of PCT patent application no. PCT/JP2019/016146, filed on Apr. 15, 2019, which claims priority to Japanese patent application no. JP2018-150509 filed on Aug. 9, 2018, the entire contents of which are being incorporated herein by reference.

BACKGROUND

The present technology generally relates to: a secondary battery including a wound electrode body that includes a wound stack of a positive electrode and a negative electrode with a separator interposed therebetween; a battery pack including the secondary battery; an electric vehicle including the secondary battery; an electric power storage system including the secondary battery; an electric power tool including the secondary battery; and an electronic apparatus including the secondary battery.

Various electronic apparatuses such as mobile phones have been widely used. Such widespread use has invoked a need for a smaller size, a lighter weight, and a longer life of the electronic apparatuses. To address the need, a secondary battery, which is smaller in size and lighter in weight and allows for a higher energy density, is under development as a power source.

A second battery is not limitedly applicable to the electronic apparatuses described above and application of the secondary battery to other uses is also considered. Examples of the other uses include: a battery pack to be detachably mounted on an apparatus such as an electronic apparatus; an electric vehicle such as an electric automobile; an electric power storage system such as a home electric power server; and an electric power tool such as an electric drill.

A secondary battery includes a wound electrode body. The wound electrode body includes a positive electrode, a negative electrode, and a separator. In the wound electrode body, the positive electrode and the negative electrode are stacked on each other with the separator interposed therebetween, and the positive electrode, the negative electrode, and the separator are wound.

A configuration of the secondary battery greatly influences battery characteristics. Accordingly, various considerations have been given to the configuration of the secondary battery. Specifically, in order to improve output while securing insulation between the positive electrode and the negative electrode in an elongated electrode body including a flat part and a curved part, a distance from the positive electrode to the negative electrode in the curved part is set to be equal to or greater than 0.99 times of a distance from the positive electrode to the negative electrode in the flat part.

SUMMARY

The present technology generally relates to: a secondary battery including a wound electrode body that includes a wound stack of a positive electrode and a negative electrode with a separator interposed therebetween; a battery pack including the secondary battery; an electric vehicle including the secondary battery; an electric power storage system including the secondary battery; an electric power tool including the secondary battery; and an electronic apparatus including the secondary battery.

Electronic apparatuses and any other type of apparatus are increasingly gaining higher performance and more functions, causing more frequent use of such apparatuses and expanding a use environment of the apparatuses. Accordingly, there is still room for improvement in terms of battery characteristics of the secondary battery.

The present technology has been made in view of such an issue and it is an object of the technology to provide a secondary battery, a battery pack, an electric vehicle, an electric power storage system, an electric power tool, and an electronic apparatus that each make it possible to achieve a superior battery characteristic.

A secondary battery according to an embodiment of the present technology includes a wound electrode body. The wound electrode body includes a positive electrode, a negative electrode, and a separator. The positive electrode and the negative electrode are stacked on each other with the separator interposed therebetween and are wound with respect to a winding axis. The wound electrode body has a section perpendicular to the winding axis. The section has an elongated shape that includes a flat part and a pair of curved parts. The curved parts oppose each other with the flat part interposed therebetween. The negative electrode includes a negative electrode current collector and a negative electrode active material layer provided on the negative electrode current collector. A width of the wound electrode body, a wound-layer number of the wound electrode body, and a ratio of a second distance to a first distance satisfy at least one of Condition A or Condition B. The first distance is a distance from one to another of two mutually adjacent parts of the negative electrode current collector in the flat part. The second distance is a distance from one to another of two mutually adjacent parts of the negative electrode current collector in any of the curved parts.

The Condition A includes: the width of the wound electrode body is from 30 millimeters to 160 millimeters; the wound-layer number of the wound electrode body is from 8 to 19; and the ratio of the second distance to the first distance is equal to or less than 0.989.

The Condition B includes: the width of the wound electrode body is greater than 160 millimeters; the wound-layer number of the wound electrode body is equal to or greater than 15; and the ratio of the second distance to the first distance is equal to or less than 0.989.

A battery pack, an electric vehicle, an electric power storage system, an electric power tool, and an electronic apparatus according to embodiments of the technology each include a secondary battery. The secondary battery has a configuration similar to that of the secondary battery according to the embodiment of the present technology as described herein.

The first distance described above is a parameter obtained on the basis of a configuration of the flat part of the wound electrode body. The second distance is a parameter obtained on the basis of a configuration of the curved part of the wound electrode body. Specifically, the first distance is a median value of a plurality of distances (each of which is a distance from one to the other of two mutually adjacent parts of the negative electrode current collector) measured in the flat part, and the second distance is a median value of a plurality of distances (each of which is a distance from one to the other of two mutually adjacent parts of the negative electrode current collector) measured in the curved part.

The width of the wound electrode body described above is a dimension of the wound electrode body in a direction perpendicular to a winding axis. Specifically, the width of the wound electrode body is a dimension in a major-axis direction of the wound electrode body having an elongated section perpendicular to the winding axis.

The wound-layer number of the wound electrode body described above is an index indicating the number of times the positive electrode, the negative electrode, and the separator are wound. Specifically, the wound-layer number is the number of parts (the number of layers) of the positive electrode that extend to intersect a reference line (a straight line S1) which will be described later.

The first distance, the second distance, the width of the wound electrode body, and the wound-layer number of the wound electrode body will each be described later in detail (referring to a definition, a measuring method, etc. thereof).

According to the secondary battery of the embodiment of the present technology, the wound electrode body having the elongated section perpendicular to the winding axis involves the width of the wound electrode body, the wound-layer number of the wound electrode body, and the ratio of the second distance to the first distance that satisfy at least one of Condition A and Condition B. This makes it possible to achieve a superior battery characteristic. According to each of the battery pack, the electric vehicle, the electric power storage system, the electric power tool, and the electronic apparatus of the embodiment of the technology, a similar effect is also obtainable.

It should be understood that effects of the technology are not necessarily limited to those described above and may include any of a series of effects described below in relation to the technology.

BRIEF DESCRIPTION OF THE FIGURES

FIG. 10 is a perspective view of a configuration of an application example (a battery pack: a single battery) of the secondary battery according to an embodiment of the present technology.

FIG. 11 is a block diagram illustrating the configuration of the battery pack illustrated in FIG. 10.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a secondary battery according to an embodiment of the technology.

The secondary battery described below obtains a battery capacity by utilizing an insertion phenomenon and an extraction phenomenon of an electrode reactant, for example. The battery capacity is, in other words, a capacity of a negative electrode 20 to be described later. The electrode reactant is a substance involved in an electrode reaction, i.e., a so-called charging reaction, and is not limited to a particular type.

Described below is an example case of using lithium as the electrode reactant. A secondary battery using lithium as the electrode reactant is a so-called lithium-ion secondary battery.

Figure 1:
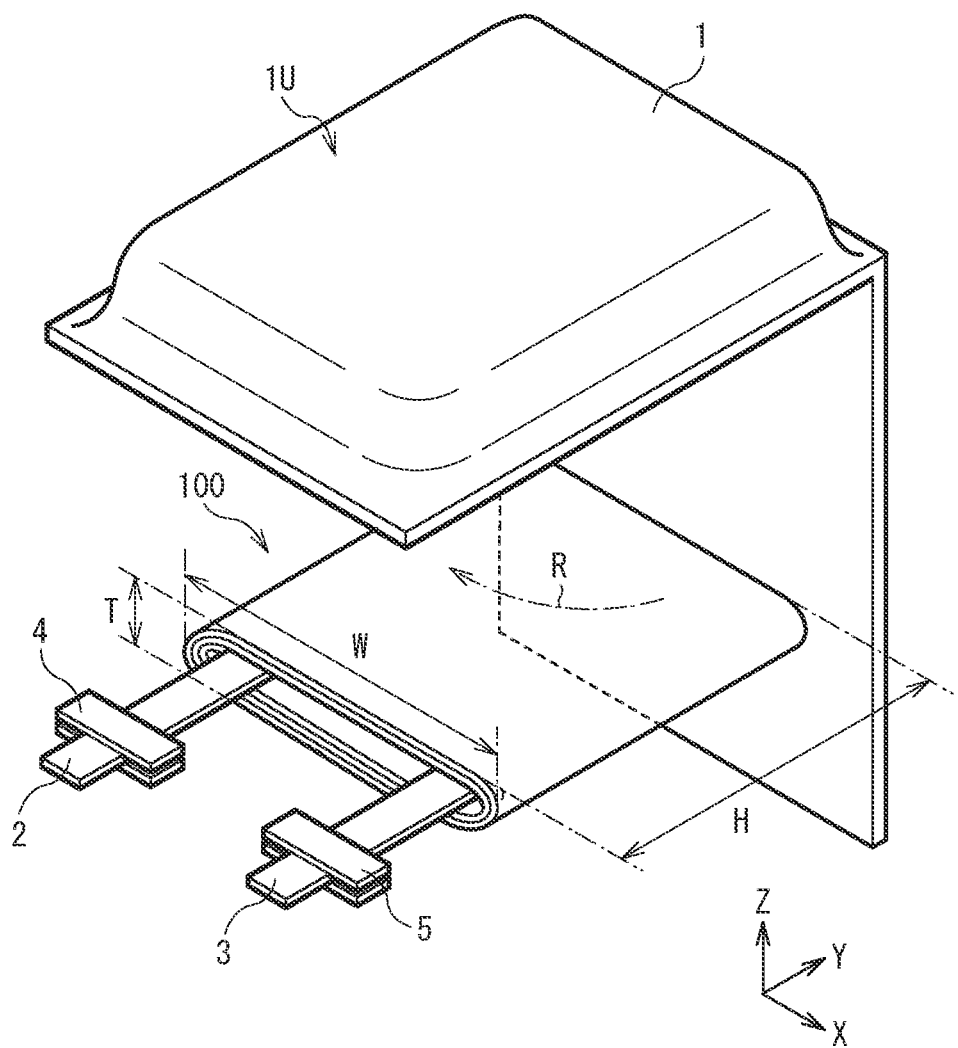
FIG. 1 is a perspective view of a configuration of a secondary battery according to an embodiment of the present technology.

FIG. 1 is a perspective view of a configuration of the secondary battery. It should be understood that FIG. 1 illustrates a state in which an outer package member 1 and a wound electrode body 100 are separated away from each other.

Referring to FIG. 1, the secondary battery is of a laminated-film type, for example. The secondary battery of the laminated-film type includes, for example, the outer package member 1 having a film shape, and the wound electrode body 100 contained in the outer package member 1. The outer package member 1 has softness or flexibility. For example, a positive electrode lead 2 and a negative electrode lead 3 are coupled to the wound electrode body 100. A sealing film 4, for example, is provided between the outer package member 1 and the positive electrode lead 2. A sealing film 5, for example, is provided between the outer package member 1 and the negative electrode lead 3.

The outer package member 1 has a film shape and contains the wound electrode body 100. The outer package member 1 is, for example, a single film that is foldable in a direction of an arrow R. The outer package member 1 has a depression 1U, for example. The depression 1U is adapted to contain the wound electrode body 100.

The outer package member 1 is a laminated body or a laminated film including, for example, a fusion-bonding layer, a metal layer, and a surface protective layer that are laminated in this order from an inner side. In a process of manufacturing the secondary battery, for example, the outer package member 1 is folded in such a manner that portions of the fusion-bonding layer oppose each other with the wound electrode body 100 interposed therebetween. Thereafter, outer edges of the fusion-bonding layer are fusion-bonded to each other. The fusion-bonding layer is, for example, a polymer film that includes a material such as polypropylene. The metal layer is, for example, a metal foil that includes a material such as aluminum or stainless steel (SUS). The surface protective layer is, for example, a polymer film that includes a material such as nylon. The outer package member 1 may include, for example, two films that are adhered to each other by means of a material such as an adhesive.

The wound electrode body 100 is a main part of the secondary battery that causes charging and discharging reactions to proceed. In other words, the wound electrode body 100 is a battery device. The wound electrode body 100 includes a positive electrode 10, a negative electrode 20, a separator 30, and an electrolytic solution which is a liquid electrolyte, as will be described later.

The wound electrode body 100 has a width W, a height H, and a thickness T. The width W described here is a dimension of the wound electrode body 100 in a direction perpendicular to a winding axis J (see FIG. 2, which will be described later), as described above. Specifically, the width W is a dimension in a major-axis direction, i.e., an X-axis direction, of the wound electrode body 100 having an elongated section perpendicular to the winding axis J. The height H is a dimension in a direction along the winding axis J, i.e., in a Y-axis direction. The thickness T is a dimension in a direction perpendicular to the winding axis J, i.e., in a Z-axis direction.

A detailed configuration of the wound electrode body 100 will be described later with reference to FIGS. 2 to 4.

The positive electrode lead 2 is coupled to the positive electrode 10, specifically, to a positive electrode current collector 11 which will be described later. The positive electrode lead 2 is led out from inside to outside the outer package member 1. The positive electrode lead 2 includes, for example, an electrically conductive material such as aluminum. The positive electrode lead 2 has a shape such as a thin plate shape or a meshed shape, for example.

The negative electrode lead 3 is coupled to the negative electrode 20, specifically, to a negative electrode current collector 21 which will be described later. The negative electrode lead 3 is led out from inside to outside the outer package member 1. A lead-out direction of the negative electrode lead 3 is, for example, similar to a lead-out direction of the positive electrode lead 2. The negative electrode lead includes, for example, an electrically conductive material such as copper. The negative electrode lead 3 has a shape similar to the shape of the positive electrode lead 2, for example.

The sealing films 4 and 5 are each adapted to prevent entry of outside air into inside of the outer package member 1. The sealing film 4 includes, for example, a material having adherence to the positive electrode lead 2. The sealing film 5 includes, for example, a material having adherence to the negative electrode lead 3. Examples of such materials include a polyolefin resin such as polypropylene.

Figure 2:
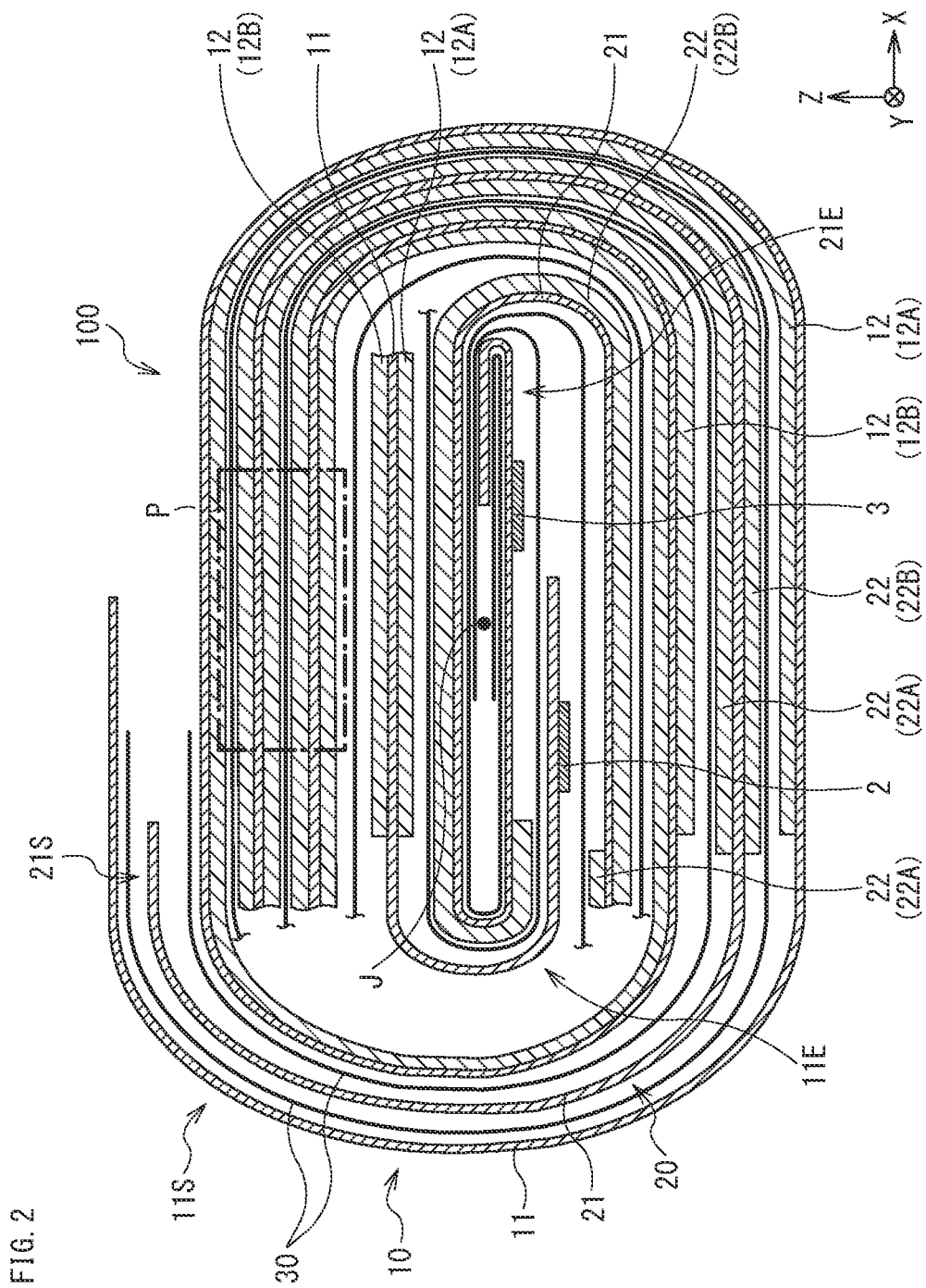
FIG. 2 is a sectional view of a configuration of a wound electrode body illustrated in FIG. 1.

FIG. 2 illustrates a sectional configuration of the wound electrode body 100 illustrated in FIG. 1. FIG. 3 schematically illustrates a planar configuration of the wound electrode body 100 illustrated in FIG. 2. FIG. 4 illustrates a part (a part P) of the sectional configuration of the wound electrode body 100 illustrated in FIG. 2 on an enlarged scale.

Figure 3:
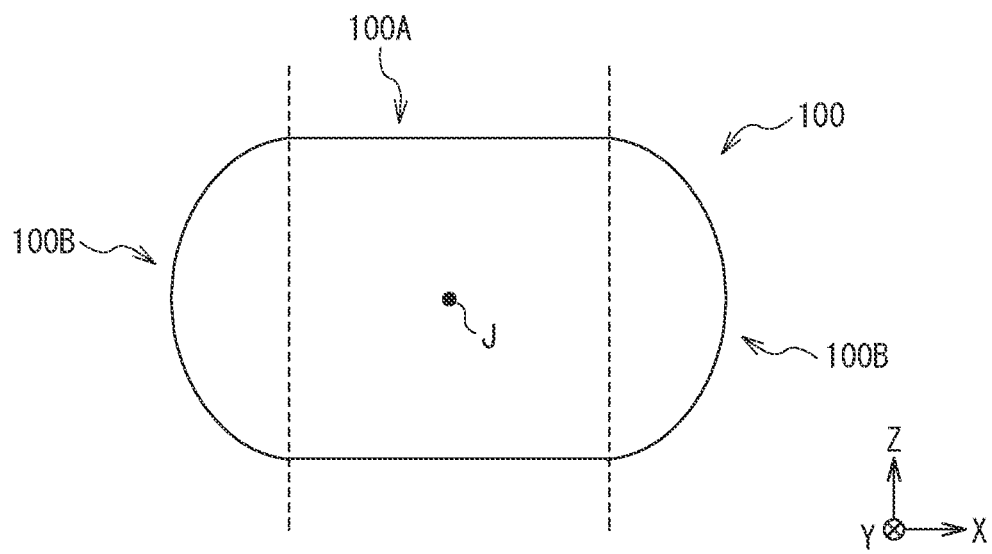
FIG. 3 is a schematic plan view of the configuration of the wound electrode body illustrated in FIG. 2.

It should be understood that FIG. 2 illustrates a section of the wound electrode body 100 taken along an X-Z plane, and FIG. 3 illustrates only an outer edge, i.e., a profile, of the wound electrode body 100.

Referring to FIG. 2, the wound electrode body 10 includes the positive electrode 10 and the negative electrode 20 that are stacked on each other with the separator 30 interposed therebetween. The positive electrode 10, the negative electrode 20, and the separator 30 are wound about the winding axis J. The winding axis J is a virtual axis extending in a predetermined direction, for example, the Y-axis direction. In the example described below, the positive electrode 10 and the negative electrode 20 are wound in such a manner that the positive electrode 10 is disposed in an outermost wind. For example, the positive electrode 10, the negative electrode 20, and the separator 30 are each impregnated with the electrolytic solution. The wound electrode body 100 may have, for example, a surface that is protected with a covering member such as a protective tape.

Figure 9:
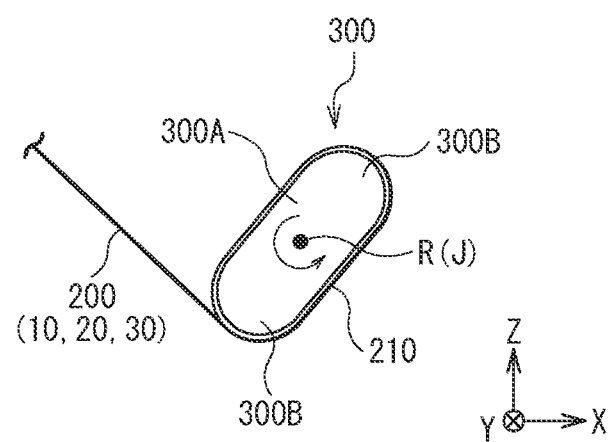
FIG. 9 is a plan view for describing a method of forming the wound electrode body according to an embodiment of the present technology.

In a process of manufacturing the secondary battery, in particular, a jig 300 including a flat part 300A and a pair of curved parts 300B is used to wind the positive electrode 10, the negative electrode 20, and the separator 30, thereby forming the wound electrode body 100, for example, as illustrated in FIG. 9. This process, which will be described later, provides an elongated shape to a section, for example, on the X-Z plane, of the wound electrode body 100 perpendicular to the winding axis J, as illustrated in FIG. 2.

Specifically, the section of the wound electrode body 100 has a shape (the elongated shape) corresponding to the shape of the jig 300. That is, referring to FIG. 3, the shape (the elongated shape) of the section of the wound electrode body 100 includes a flat part 100A, and a pair of curved parts 100B opposing each other with the flat part 100A interposed therebetween. FIG. 3 includes a dashed line that indicates a border between the flat part 100A and each of the curved parts 100B for easier distinction between the flat part 100A and the curved parts 100B.

Figure 4:
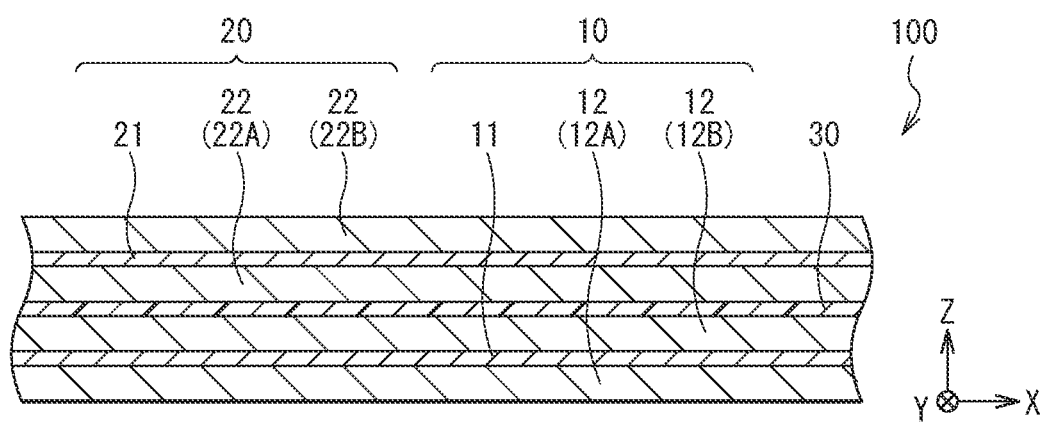
FIG. 4 is an enlarged sectional view of a part (a part P) of the configuration of the wound electrode body illustrated in FIG. 2.

As illustrated in FIG. 4, the positive electrode 10 includes, for example, the positive electrode current collector 11, and a positive electrode active material layer 12 provided on the positive electrode current collector 11.

The positive electrode current collector 11 includes an inner surface and an outer surface. The positive electrode current collector 11 includes, for example, an electrically conductive material such as aluminum. The positive electrode active material layer 12 includes: an inner layer 12A provided on the inner surface of the positive electrode current collector 11; and an outer layer 12B provided on the outer surface of the positive electrode current collector 11.

The positive electrode active material layer 12, i.e., each of the inner layer 12A and the outer layer 12B, includes, as a positive electrode active material, a positive electrode material into which lithium is insertable and from which lithium is extractable. The positive electrode active material layer 12 may further include another material, examples of which include a positive electrode binder and a positive electrode conductor.

The positive electrode material includes one or more materials, examples of which include lithium-containing compounds, for example. A reason for this is that a high energy density is achievable. The lithium-containing compound is not limited to a particular kind, and examples thereof include a lithium-containing composite oxide and a lithium-containing phosphate compound. The term "lithium-containing composite oxide" is a generic term for an oxide that includes, as constituent elements, lithium and one or more of other elements. The lithium-containing composite oxide has any of crystal structures including, without limitation, a layered rock-salt crystal structure and a spinel crystal structure, for example. The term "lithium-containing phosphate compound" is a generic term for a phosphate compound that includes, as constituent elements, lithium and one or more of the other elements. The lithium-containing phosphate compound has a crystal structure such as an olivine crystal structure, for example.

The other elements are elements other than lithium. The other elements are not limited to particular kinds. Examples of the other elements include elements that belong to groups 2 to 15 in the long periodic table of elements. Specific examples of the other elements include nickel, cobalt, manganese, and iron. A reason for this is that a higher voltage is obtainable.

Examples of the lithium-containing composite oxide having the layered rock-salt crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$. Examples of the lithium-containing composite oxide having the spinel crystal structure include $LiMn_2O_4$. Examples of the lithium-containing phosphate compound having the olivine crystal structure include $LiFePO_4$, $LiMnPO_4$, $LiFe_{0.5}Mn_{0.5}PO_4$, and $LiFe_{0.3}Mn_{0.7}PO_4$.

A thickness of each of the inner layer 12A and the outer layer 12B is not particularly limited. For example, the inner layer 12A and the outer layer 12B each have a thickness within a range from 37.5 μm to 55 μm both inclusive. An area density of each of the inner layer 12A and the outer layer 12B is not particularly limited. For example, the inner layer 12A and the outer layer 12B in combination have an area density within a range from 30 mg/cm$^2$ to 45 mg/cm$^2$ both inclusive.

The positive electrode binder includes, for example, one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride and polyimide.

The positive electrode conductor includes, for example, one or more electrically conductive materials including, without limitation, a carbon material. Examples of the carbon material include graphite, carbon black, acetylene black, and Ketjen black. The positive electrode conductor may include a material such as a metal material or an electrically conductive polymer.

Regarding the positive electrode 10, for example, the positive electrode active material layer 12 is provided only on a part of the positive electrode current collector 11. Specifically, for example, as illustrated in FIG. 2, the positive electrode current collector 11 includes a non-provision part 11S and a non-provision part 11E on each of which neither the inner layer 12A nor the outer layer 12B is provided. The non-provision part 11S extends, for example, from an end of the positive electrode 10 on an outer side of winding toward an inner side of the winding in a winding direction. The end of the positive electrode 10 on the outer side of the winding corresponds to the end thereof in the outermost wind. The non-provision part 11E extends, for example, from an end of the positive electrode 10 on the inner side of the winding toward the outer side of the winding in the winding direction. The end of the positive electrode 10 on the inner side of the winding corresponds to the end thereof in the innermost wind. A length of the non-provision part 11S in the winding direction of the positive electrode 10 corresponds to, for example, about a half wind from the end on the outer side of the winding, although not particularly limited thereto. A length of the non-provision part 11E in the winding direction of the positive electrode 10 corresponds to, for example, about a half wind from the end on the inner side of the winding, although not particularly limited there to.

For example, a range over which the inner layer 12A is provided on the outer side of the winding and a range over which the outer layer 12B is provided on the outer side of the winding are different from each other. Specifically, for example, an end of the inner layer 12A on the outer side of the winding is positioned more outwardly than an end of the outer layer 12B on the outer side of the winding.

For example, a range over which the inner layer 12A is provided on the inner side of the winding and a range over which the outer layer 12B is provided on the inner side of the winding match each other. That is, a position of an end of the inner layer 12A on the inner side of the winding matches a position of an end of the outer layer 12B on the inner side of the winding, for example.

For example, a level-difference reducing tape may be provided at and in the vicinity of each of the ends of the inner layer 12A on the outer side of the winding and on the inner side of the winding, thereby reducing an influence of a level difference resulting from the end. Similarly, a level-difference reducing tape may be provided at and in the vicinity of each of the ends of the outer layer 12B on the outer side of the winding and on the inner side of the winding.

As illustrated in FIG. 4, the negative electrode 20 includes, for example, a negative electrode current collector 21, and a negative electrode active material layer 22 provided on the negative electrode current collector 21.

The negative electrode current collector 21 includes an inner surface and an outer surface. The negative electrode current collector 21 includes, for example, an electrically conductive material such as copper. The negative electrode active material layer 22 includes, for example: an inner layer 22A provided on the inner surface of the negative electrode current collector 21; and an outer layer 22B provided on the outer surface of the negative electrode current collector 21.

The negative electrode active material layer 22, i.e., each of the inner layer 22A and the outer layer 22B, includes, as a negative electrode active material, a negative electrode material into which lithium is insertable and from which lithium is extractable. The negative electrode active material layer 22 may further include another material, examples of which include a negative electrode binder and a negative electrode conductor.

To prevent unintentional precipitation of lithium metal on a surface of the negative electrode 20 during charging, it is preferable that a chargeable capacity of the negative electrode material be greater than a discharge capacity of the positive electrode 10. In other words, it is preferable that an electrochemical equivalent of the negative electrode material be greater than an electrochemical equivalent of the positive electrode 10.

The negative electrode material includes, for example, one or more of materials including, without limitation, a carbon material and a metal-based material.

The term "carbon material" is a generic term for a material including carbon as a constituent element. Examples of the carbon material include graphitizable carbon, non-graphitizable carbon, and graphite. A reason for this is that a high energy density is stably obtainable owing to the crystal structure of the carbon material which hardly varies upon insertion and extraction of lithium. Another reason is that improved electrical conductivity of the negative electrode active material layer 22 is achievable owing to the carbon material which also serves as the negative electrode conductor.

More specific examples of the carbon material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is a resultant of firing or carbonizing a polymer compound such as a phenol resin or a furan resin at an appropriate temperature. Other than the above, the carbon material may be low-crystalline carbon heat-treated at a temperature of about 1000° C. or lower, or may be amorphous carbon, for example. The carbon material has one or more of shapes including, without limitation, a fibrous shape, a spherical shape, a granular shape, and a scale-like shape.

In particular, it is preferable that the carbon material include natural graphite, artificial graphite, or both. A reason for this is that a sufficiently high energy density is stably obtainable and an electric conductivity of the negative electrode active material layer 22 is sufficiently improved.

The term "metal-based material" is a generic term for a material including any one or more of metal elements and metalloid elements as constituent elements. A reason for this is that a higher energy density is achievable.

The metal-based material may be a simple substance, an alloy, a compound, a mixture of two or more thereof, or a material including one or more phases thereof. The simple substance described here may include a small amount of impurity, and therefore does not necessarily have purity of 100%. It should be understood that the term "alloy" encompasses, for example, not only a material that includes two or more metal elements but may also encompass a material that includes one or more metal elements and one or more metalloid elements. The alloy may further include one or more non-metallic elements. The metal-based material has a state such as a solid solution, a eutectic (a eutectic mixture), an intermetallic compound, or a state including two or more thereof that coexist.

The metal element and the metalloid element are each able to form an alloy with lithium, for example. Specific examples of the metal element and the metalloid element include magnesium, boron, aluminum, gallium, indium, silicon, germanium, tin, lead, bismuth, cadmium, silver, zinc, hafnium, zirconium, yttrium, palladium, and platinum.

In particular, it is preferable that the metal-based material include silicon as a constituent element. That is, it is preferable that the metal-based material include one or more materials among a simple substance of silicon, a silicon alloy, and a silicon compound, as described above. A reason for this is that a sufficiently high energy density is stably obtainable.

The silicon alloy includes, as a constituent element or constituent elements other than silicon, for example, one or more of elements including, without limitation, tin, nickel, copper, iron, cobalt, manganese, zinc, indium, silver, titanium, germanium, bismuth, antimony, and chromium. The silicon compound includes, as a constituent element or constituent elements other than silicon, for example, one or more of elements including, without limitation, carbon and oxygen. The silicon compound may include, as a constituent element or constituent elements other than silicon, for example, one or more of the series of constituent elements described in relation to the silicon alloy.

Examples of the silicon alloy and the silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ (where $0<v\leq2$), and $LiSiO$. Note, however, that a range of "v" may be $0.2<v<1.4$, in one example.

In particular, it is preferable that the negative electrode material include both the carbon material and the metal-based material for the following reasons.

The metal-based material, particularly the material including silicon as a constituent element, has an advantage of being high in theoretical capacity, but on the other hand, has an issue of greatly expanding and contracting upon charging and discharging. In contrast, the carbon material has an issue of being low in theoretical capacity, but on the other hand, has an advantage of being less likely to expand and contract upon charging and discharging. Accordingly, the combined use of the carbon material and the metal-based material secures a high theoretical capacity, i.e., a high battery capacity, while reducing expansion and contraction of the negative electrode active material layer 22 upon charging and discharging.

A thickness of each of the inner layer 22A and the outer layer 22B is not particularly limited. For example, the inner layer 22A and the outer layer 22B each have a thickness within a range from 47.5 µm to 72.5 µm both inclusive. An area density of each of the inner layer 22A and the outer layer 22B is not particularly limited. For example, the inner layer 22A and the outer layer 22B in combination have an area density within a range from 15 mg/cm² to 25 mg/cm² both inclusive.

Details of the negative electrode binder are similar to those of the positive electrode binder described above, for example. Details of the negative electrode conductor are similar to those of the negative electrode conductor described above, for example.

A method of forming the negative electrode active material layer 22 is not particularly limited, and examples thereof include a coating method, a vapor-phase method, a liquid-phase method, a spraying method, and a firing (sintering) method. Examples of the vapor-phase method include a physical deposition method and a chemical deposition method. More specific examples of the vapor-phase method include a vacuum deposition method, a sputtering method, an ion plating method, a laser ablation method, a thermal chemical vapor deposition method, a chemical vapor deposition (CVD) method, and a plasma chemical vapor deposition method. Examples of the liquid-phase method include an electrolytic plating method and an electroless plating method. Examples of the firing method include an atmosphere firing method, a reactive firing method, and a hot-press firing method.

Regarding the negative electrode 20, for example, the negative electrode active material layer 22 is provided only on a part of the negative electrode current collector 21. Specifically, for example, as illustrated in FIG. 2, the negative electrode current collector 21 includes a non-provision part 21S and a non-provision part 21E on each of which neither the inner layer 22A nor the outer layer 22B is provided. The non-provision part 21S extends, for example, from an end of the negative electrode 20 on an outer side of the winding toward an inner side of the winding in a winding direction. The end of the negative electrode 20 on the outer side of the winding corresponds to the end thereof in the outermost wind. The non-provision part 21E extends, for example, from an end of the negative electrode 20 on an inner side of the winding toward the outer side of the winding in the winding direction. The end of the negative electrode 20 on the inner side of the winding corresponds to the end thereof in the innermost wind. A length of the non-provision part 21S in the winding direction of the negative electrode 20 corresponds to, for example, about a half wind from the end on the outer side of the winding, although not particularly limited thereto. A length of the non-provision part 21E in the winding direction of the negative electrode 20 corresponds to, for example, about a half wind from the end on the inner side of the winding, although not particularly limited thereto.

For example, a range over which the inner layer 22A is provided on the outer side of the winding and a range over which the outer layer 22B is provided on the outer side of the winding match each other. That is, a position of an end of the inner layer 22A on the outer side of the winding matches a position of an end of the outer layer 22B on the outer side of the winding, for example.

For example, a range over which the inner layer 22A is provided on the inner side of the winding and a range in which the outer layer 22B over provided on the inner side of the winding are different from each other. Specifically, for example, an end of the inner layer 22A on the inner side of the winding is positioned more outwardly than an end of the outer layer 22B on the inner side of the winding.

The level-difference reducing tape may be provided for the negative electrode 20, as with the positive electrode 10. Specifically, for example, the level-difference reducing tape may be provided at and in the vicinity of each of the ends of the inner layer 22A on the outer side of the winding and on the inner side of the winding, or the level-difference reducing tape may be provided at and in the vicinity of each of the ends of the outer layer 22B on the outer side of the winding and on the inner side of the winding.

[Separator]

The separator 30 includes, for example, a porous film. For example, the separator 30 has a thickness within a range from 5 μm to 20 μm both inclusive; however, the thickness of the separator 30 is not particularly limited thereto. The porous film includes, for example, one or more of materials including, without limitation, a synthetic resin and ceramic. Examples of the synthetic resin include polyethylene. The separator 30 may be, for example, a stacked film including two or more porous films that are stacked on each other.

The separator 30 may include, for example, the porous film and a polymer compound layer. The porous film serves as a base layer. The polymer compound layer is provided on one side or on each side of the base layer, for example. The polymer compound layer includes, for example, a polymer compound such as polyvinylidene difluoride, and may further include insulating particles such as inorganic particles. The inorganic particles are not limited to a particular kind, and examples thereof include aluminum oxide and aluminum nitride.

The electrolytic solution includes, for example, a solvent and an electrolyte salt.

The solvent includes, for example, one or more of non-aqueous solvents including, without limitation, an organic solvent. Examples of the non-aqueous solvents include a cyclic carbonate ester, a chain carbonate ester, a lactone, a chain carboxylate ester, and a nitrile (mononitrile) compound. Examples of the cyclic carbonate ester include ethylene carbonate and propylene carbonate. Examples of the chain carbonate ester include dimethyl carbonate and diethyl carbonate. Examples of the lactone include γ-butyrolactone and γ-valerolactone. Examples of the chain carboxylate ester include methyl acetate, ethyl acetate, and methyl propionate. Examples of the nitrile compound include acetonitrile, methoxy acetonitrile, and 3-methoxy propionitrile.

Further examples of the non-aqueous solvent include an unsaturated cyclic carbonate ester, a halogenated carbonate ester, a sulfonate ester, an acid anhydride, a dicyano compound (a dinitrile compound), a diisocyanate compound, and a phosphate ester. Examples of the unsaturated cyclic carbonate ester include vinylene carbonate, vinyl ethylene carbonate, and methylene ethylene carbonate. Examples of the halogenated carbonate ester include 4-fluoro-1,3-dioxolane-2-one, 4,5-difluoro-1,3-dioxolane-2-one, and fluoromethyl methyl carbonate. Examples of the sulfonate ester include 1,3-propane sultone and 1,3-propene sultone. Examples of the acid anhydride include succinic anhydride, glutaric anhydride, maleic anhydride, ethane disulfonic anhydride, propane disulfonic anhydride, sulfobenzoic anhydride, sulfopropionic anhydride, and sulfobutyric anhydride. Examples of the dinitrile compound include succinonitrile, glutaronitrile, adiponitrile, and phthalonitrile. Examples of the diisocyanate compound include hexamethylene diisocyanate. Examples of the phosphate ester include trimethyl phosphate and triethyl phosphate.

The electrolyte salt includes, for example, one or more of salts including, without limitation, a lithium salt. Examples of the lithium salt include lithium hexafluorophosphate ($LiPF_6$), lithium tetrafluoroborate ($LiBF_4$), lithium bis(fluorosulfonyl)imide ($LiN(SO_2F)_2$), lithium bis(trifluoromethane sulfonyl)imide ($LiN(CF_3SO_2)_2$), lithium difluorophosphate ($LiPF_2O_2$), and lithium fluorophosphate ($Li_2PFO_3$). A content of the electrolyte salt is, for example, from 0.3 mol/kg to 3.0 mol/kg both inclusive with respect to the solvent, but is not particularly limited thereto.

Figure 5:
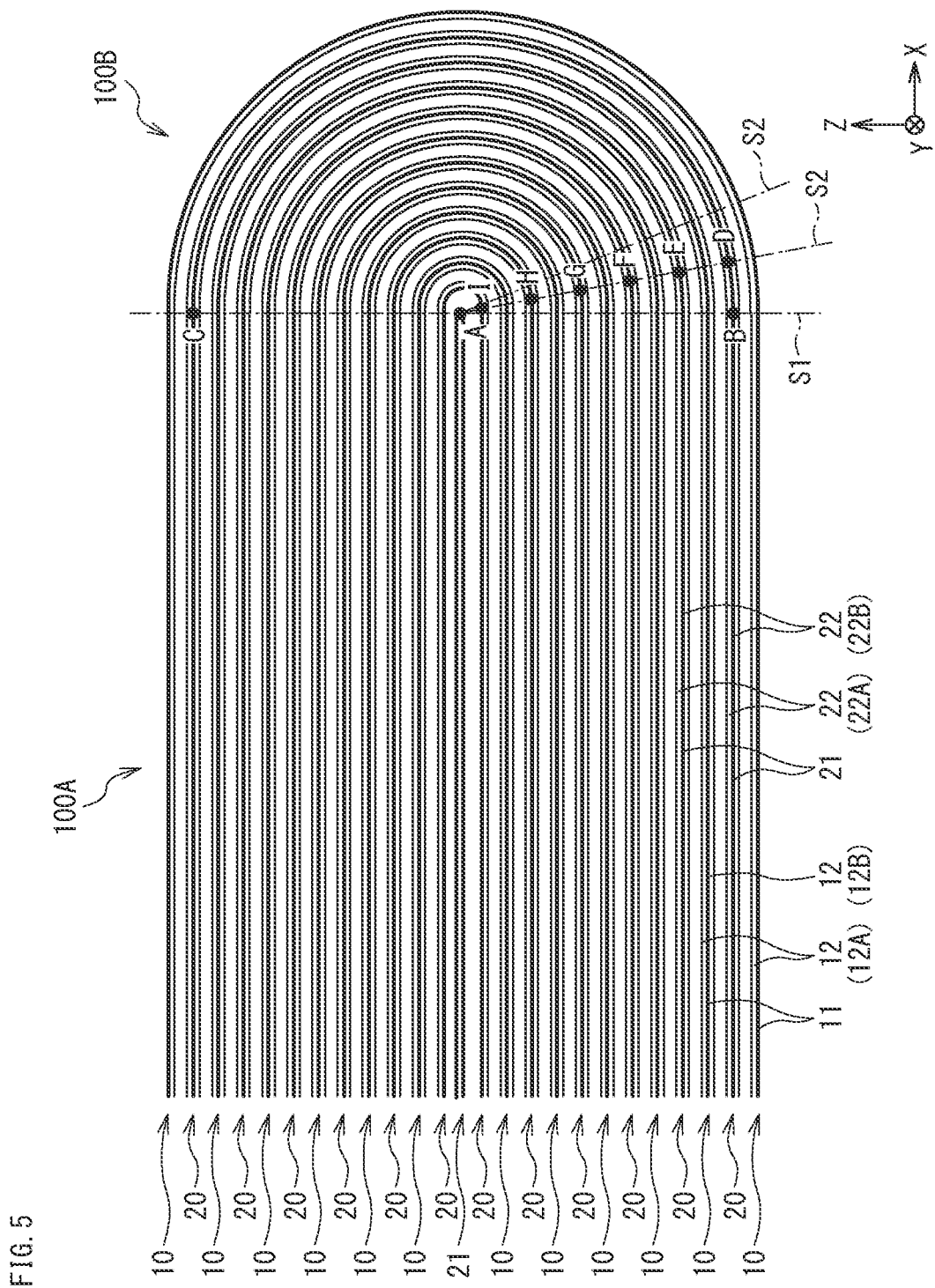
FIG. 5 is an enlarged schematic view of a part (a flat part and a curved part) of the configuration of the wound electrode body illustrated in FIG. 2.
Figure 6:
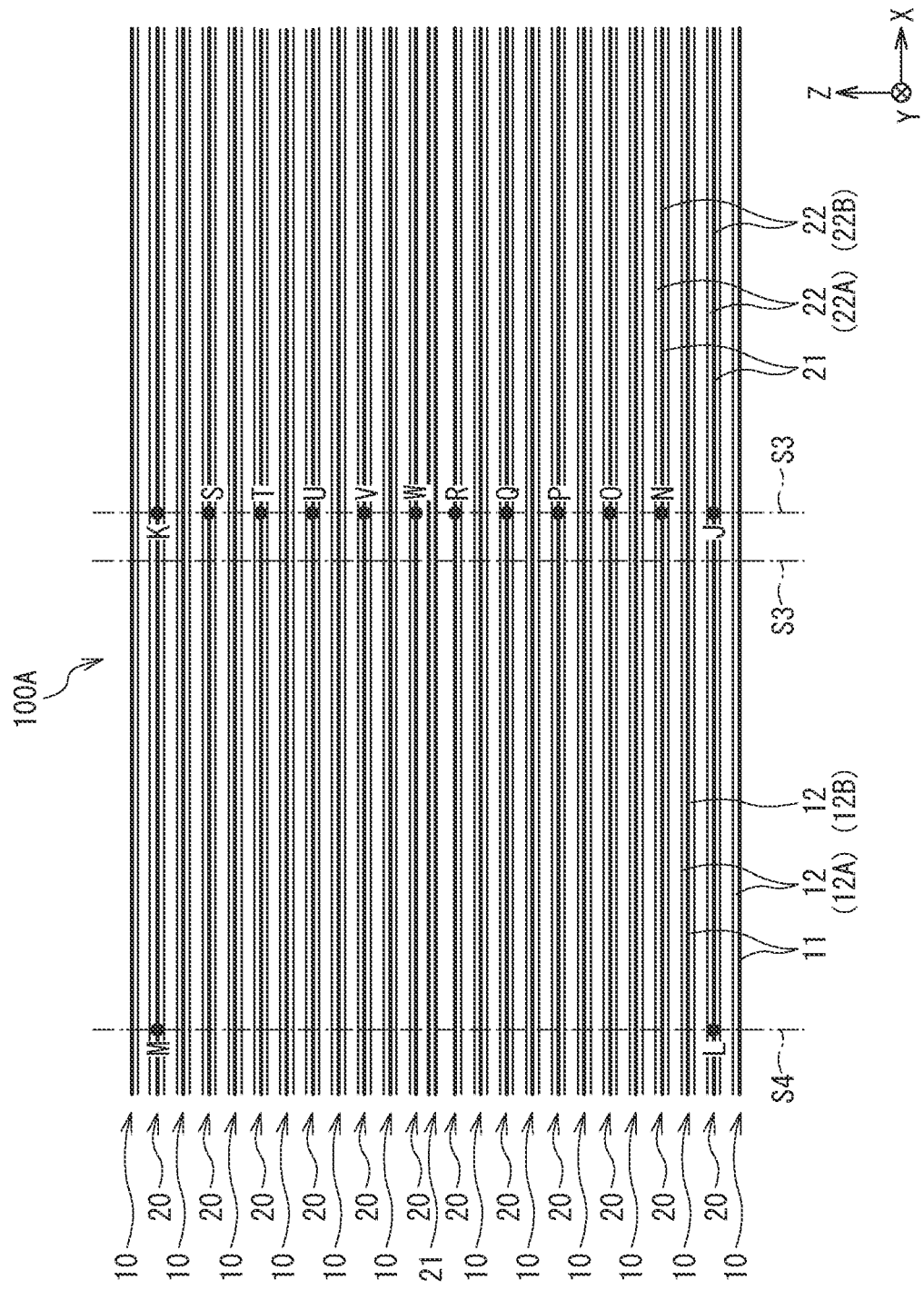
FIG. 6 is an enlarged schematic view of a part (the flat part) of the configuration of the wound electrode body illustrated in FIG. 2.

FIGS. 5 and 6 each illustrate a part of the configuration of the wound electrode body 100 illustrated in FIG. 2, on an enlarged scale. It should be understood that FIG. 5 illustrates the flat part 100A and the curved part 100B, and FIG. 6 illustrates the flat part 100A. Further, FIGS. 5 and 6 each illustrate the configuration of each of the positive electrode 10 and the negative electrode 20 in a schematic manner, and omits illustration of the separator 30.

In the secondary battery, a distance D from one to the other of two mutually adjacent parts of the negative electrode current collector 21 is made appropriate depending on a location of the wound electrode body 100. The distance D from one to the other of two mutually adjacent parts of the negative electrode current collector 21 is a so-called inter-negative-electrode distance. A description is given below of a definition of each of the distances D (D1 and D2) and the wound-layer number N, and then of conditions (the width W, the wound-layer number N, and a distance ratio D2/D1) related to the configuration of the wound electrode body 100 and a method of measuring each of the conditions related to the configuration.

A distance D2 (a second distance) represents the distance D in the curved part 100B. The distance D2 is a parameter determined on the basis of the configuration of the curved part 100B, as described above. Specifically, the distance D2 is a median value of a plurality of distances D measured in the curved part 100B. Each of the plurality of distances D is the distance D from one to the other of the two mutually adjacent parts of the negative electrode current collector 21.

A definition (a determination procedure) of the distance D2 is as follows. Here, the definition of the distance D2 is described with reference to FIG. 5. As illustrated in FIG. 5, for example, the positive electrode 10 is disposed in the outermost wind, and only the inner layer 12A is provided on the positive electrode current collector 11 of the positive electrode 10 in the outermost wind, as described above. For example, the negative electrode 20 is disposed in the innermost wind, and only the outer layer 22B is provided on the negative electrode current collector 21 of the negative electrode 20 in the innermost wind. It should be understood that FIG. 5 illustrates an example case where the wound-layer number N is 11.

To determine the distance D2, first, a point at which the negative electrode current collector 21 in the innermost wind is folded is set as a point A. Thereafter, a straight line S1 is set that passes through the point A and extends in the thickness direction (i.e., the Z-axis direction). Thereafter, two intersections of the negative electrode current collector 21 in the outermost wind and the straight line S1 are set as points B and C. Thereafter, a point shifted from the point B toward the inner side of the curved part 100B by 0.05 mm along the negative electrode current collector 21 is set as a point D, following which a straight line S2 is set that passes through both the points A and D. Thereafter, intersections of the straight line S2 and parts of the negative electrode current collector 21 positioned on the inner side relative to the part of negative electrode current collector 21 in the outermost wind are set as points E, F, G, H, and I. Thereafter, a distance from the point D to the point E, a distance from the point E to the point F, a distance from the point F to the point G, a distance from the point G to the point H, and a distance from the point H to the point I are measured.

Thereafter, a point shifted from the point D toward the inner side of the curved part 100B by 0.05 mm along the negative electrode current collector 21 is set as a new point D, and a new straight line S2 is set that passes through both the new points A and D. Thereafter, the points E, F, G, H, and I are set again on the basis of the new straight line S2, to measure again a distance from the point D to the point E, a distance from the point E to the point F, a distance from the point F to the point G, a distance from the point G to the point H, and a distance from the point H to the point I. FIG. 5 illustrates only the new straight line S2 and omits illustration of the new points D, E, F, G, H, and I for simple illustration. Thereafter, the above-described procedures of measuring the four distances on the basis of the new straight line S2 and the new points D, E, F, G, H, and I are repeated within a range where the newly set point D does not exceed the point C.

Lastly, a median value of the series of distances measured by the above-described procedures is calculated, and the calculated median value is set as the distance D2. As can be appreciated from the above-described determination procedures, the distance D2 is a mean value (the median value) of the series of the distances D measured inside the curved part 100B. It should be understood that the value of the distance D2 is rounded off to one decimal place.

A distance D1 (a first distance) represents the distance D in the flat part 100A. The distance D1 is a parameter determined on the basis of the configuration of the flat part 100A, as described above. Specifically, the distance D1 is a median value of a plurality of distances D measured in the flat part 100A. Each of the plurality of distances D is the distance D from one to the other of the two mutually adjacent parts of the negative electrode current collector 21.

A definition (a determination procedure) of the distance D1 is as follows. Here, the definition of the distance D1 is described with reference to FIGS. 5 and 6. A premise condition described in relation to FIG. 5 is similarly applicable to FIG. 6.

To determine the distance D1, first, in accordance with the procedures described with reference to FIG. 5, a straight line S1 that passes through the point A is set, and points B and C are set. Thereafter, as illustrated in FIGS. 5 and 6, a point shifted from the point B toward the inner side of the flat part 100A by 5 mm along the negative electrode current collector 21 is set as a point J, and a point shifted from the point C toward the inner side of the flat part 100A by 5 mm along the negative electrode current collector 21 is set as a point K, following which a straight line S3 is set that passes through both the points J and K. Thereafter, as illustrated in FIG. 6, a point shifted from the point J toward the inner side of the flat part 100A by 5 mm is set as a point L, and a point shifted from the point K toward the inner side of the flat part 100A by 5 mm is set as a point M, following which a straight line S4 is set that passes through both the points L and M. Thereafter, intersections of the straight line S3 and parts of the negative electrode current collector 21 positioned on the inner side relative to the points J and K, i.e., the parts of the negative electrode current collector 21 in the outermost wind, are set as points N, O, P, Q, R, S, T, U, V, and W. Thereafter, a distance from the point J to the point N, a distance from the point N to the point O, a distance from the point O to the point P, a distance from the point P to the point Q, a distance from the point Q to the point R, a distance from the point K to the point S, a distance from the point S to the point T, a distance from the point T to the point U, a distance from the point U to the point V, and a distance from the point V to the point W are measured.

Thereafter, a point shifted from the point J toward the inner side of the flat part 100A by 0.05 mm along the negative electrode current collector 21 is set as a new point J, and a point shifted from the point K toward the inner side of the flat part 100A by 0.05 mm along the negative electrode current collector 21 is set as a new point K, and a new straight line S3 is set thereby that passes through both the new points J and K. Thereafter, the points N, O, P, Q, R, S, T, U, V, and W are set again on the basis of the new straight line S3, to measure again a distance from the point J to the point N, a distance from the point N to the point O, a distance from the point O to the point P, a distance from the point P to the point Q, a distance from the point Q to the point R, a distance from the point K to the point S, a distance from the point S to the point T, a distance from the point T to the point U, a distance from the point U to the point V, and a distance from the point V to the point W. FIG. 6 illustrates only the new straight line S3 and omits illustration of the new points N, O, P, Q, R, S, T, U, V, and W for simple illustration. Thereafter, the above-described procedures of measuring the ten distances on the basis of the new straight line S3 and the new points N, O, P, Q, R, S, T, U, V, and W are repeated within a range where the newly set point J does not exceed the point L and the newly set point K does not exceed the point M.

Lastly, a median value of the series of distances measured by the above-described procedures is calculated, and the calculated median value is set as the distance D1. As can be appreciated from the above-described determination procedures, the distance D1 is a mean value (the median value) of the series of the distances D measured inside the flat part 100A. It should be understood that the value of the distance D1 is rounded off to one decimal place.

The wound-layer number N is an index indicating the number of times the positive electrode 10, the negative electrode 20, and the separator 30 are wound, as described above. Specifically, as illustrated in FIG. 5, the wound-layer number N is the number of parts (the number of layers) of the positive electrode 10 that extend to intersect the straight line S1 serving as a reference line.

It should be understood that, in a case where both the inner layer 12A and the outer layer 12B are provided on the positive electrode current collector 11 of the part of the positive electrode 10 intersecting the straight line S1, the part of the positive electrode 10 is counted as 1 to determine the wound-layer number N. In a case where only one of the inner layer 12A and the outer layer 12B is provided on the positive electrode current collector 11 of the part of the positive electrode 10 intersecting the straight line S1, the part of the positive electrode 10 is counted as 0.5 to determine the wound-layer number N.

FIG. 5 illustrates an example where, out of the parts of the positive electrode 10 intersecting the straight line S1, the number of the parts of the positive electrode 10 including only the inner layer 12A is two, and the number of the parts of the positive electrode 10 including both the inner layer 12A and the outer layer 12B is ten, as described above. Accordingly, the wound-layer number N is calculated as: $N = 0.5 \times 2 + 1 \times 10 = 11$.

[Configuration Conditions (Width W, Wound-Layer Number N, and Distance Ratio D2/D1)]

In the secondary battery, the distance ratio D2/D1 is made appropriate in relation to the width W and the wound-layer number N. It should be understood that the value of the distance ratio D2/D1 is rounded off to three decimal places. Specifically, the three parameters, i.e., the width W, the wound-layer number N, and the distance ratio D2/D1, satisfy Condition A described below or Condition B described below.

Condition A is that the distance ratio D2/D1 is equal to or less than 0.989 in a case where: the width W is equal to or greater than 30 mm and equal to or less than 160 mm; and the wound-layer number is equal to or greater than N8 and equal to or less than 19. Condition B is that the distance ratio D2/D1 is equal to or less than 0.989 in a case where: the width W is greater than 160 mm; and the wound-layer number N is equal to or greater than 15.

A reason why Condition A described above or Condition B described above is satisfied is that the distance from one to the other of the two mutually adjacent parts of the negative electrode current collector 21 becomes appropriately smaller in the curved part 100B than in the flat part 100A. In this case, upon forming the wound electrode body 100, that is, upon winding the positive electrode 10, the negative electrode 20, and the separator 30, greater force is applied to wind the positive electrode 10, the negative electrode 20, and the separator 30 in the curved part 100B than in the flat part 100A, causing the positive electrode 10, the negative electrode 20, and the separator 30 to be tightened with greater force in the curved part 100B than in the flat part 100A. Accordingly, confining force resulting from the tightening upon winding is greater in the curved part 100B than in the flat part 100A, and physical strength is also greater in the curved part 100B than in the flat part 100A, suppressing swelling of the wound electrode body 100 in the width direction (i.e., the X-axis direction) upon charging and discharging. This suppresses swelling of the secondary battery while securing a discharge capacity upon charging and discharging.

A reason why the wound-layer number N is equal to or greater than 8 in each of Condition A and Condition B is that, in a case where the wound-layer number N is less than 8, the confining force resulting from the tightening upon winding becomes insufficient in the first place, making it difficult to suppress swelling of the secondary battery even if each of the width W and the distance ratio D2/D1 is adjusted.

In particular, it is preferable that the distance ratio D2/D1 be equal to or greater than 0.930. A reason for this is that this suppresses swelling of the wound electrode body 100 not only in the width direction but also in the thickness direction (i.e., the Z-axis direction) upon charging, thereby further suppressing swelling of the secondary battery.

Figure 7:
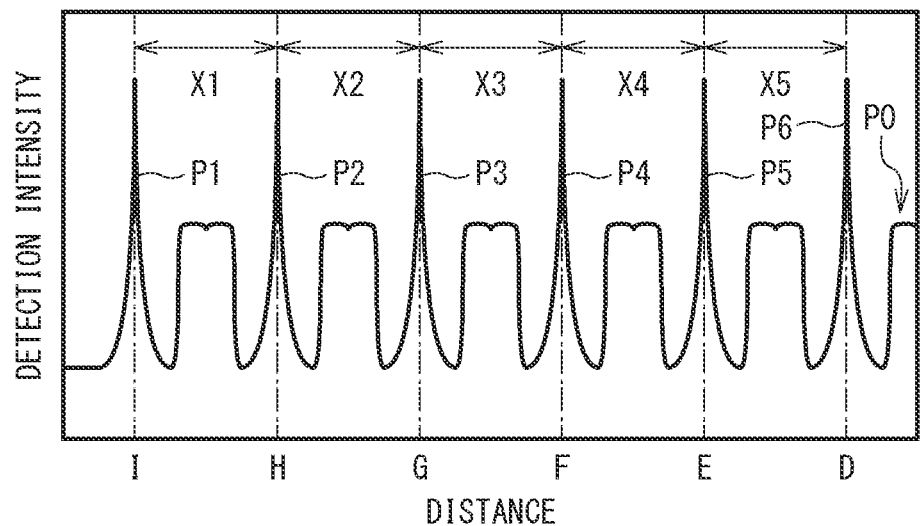
FIG. 7 is a diagram illustrating a line profile of the wound electrode body (the curved part) measured by computed tomography according to an embodiment of the present technology.
Figure 8:
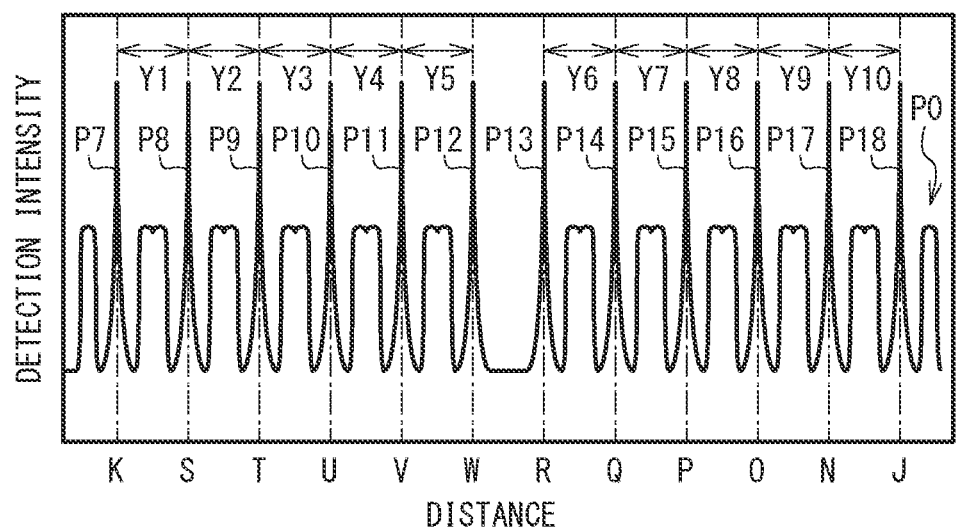
FIG. 8 is a diagram illustrating a line profile of the wound electrode body (the flat part) measured by computed tomography according to an embodiment of the present technology.

FIGS. 7 and 8 each illustrate a line profile of the wound electrode body 100 measured by computed tomography. FIG. 7 illustrates a line profile of the curved part 100B illustrated in FIG. 5, and the characters I, H, G, F, E, and D in FIG. 7 correspond to the points I, H, G, F, E, and D illustrated in FIG. 5. FIG. 8 illustrates a line profile of the flat part 100A illustrated in FIG. 6, and the characters K, S, T, U, V, W, R, Q, P, O, N, and J in FIG. 8 correspond to the points K, S, T, U, V, W, R, Q, P, O, N, and J illustrated in FIG. 6.

To determine the distance D2, for example, a computed tomography apparatus using X-rays as a light source, i.e., a so-called X-ray CT (Computed Tomography) scanner is used to measure the curved part 100B. The line profile of the curved part 100B is thereby obtained, as illustrated in FIG. 7. A horizontal axis of the line profile represents a distance, i.e., a position in the curved part 100B, and a vertical axis thereof represents X-ray detection intensity. For example, in a case where the positive electrode active material layer 12 includes the lithium-containing compound (lithium cobalt oxide ($LiCoO_2$)) and the negative electrode current collector 21 includes copper, two or more peaks P0 are detected at respective positions where the positive electrode active material layer 12 is present, and peaks P1 to P6 are detected at respective positions where the negative electrode current collector 21 is present, as illustrated in FIG. 7. The detection of these peaks results from a difference between radiolucency of the lithium-containing compound and radiolucency of the copper. The peaks P1 to P6 derive from the negative electrode current collector 21 present at the points I, H, G, F, E, and D, respectively.

The distance from the point D to the point E, the distance from the point E to the point F, the distance from the point F to the point G, the distance from the point G to the point H, and the distance from the point H to the point I are measured on the basis of the line profile of the curved part 100B. That is, a distance (an inter-peak-top distance) X1 from the peak P1 to the peak P2 corresponds to the distance from the point H to the point I. A distance X2 from the peak P2 to the peak P3 corresponds to the distance from the point G to the point H. A distance X3 from the peak P3 to the peak P4 corresponds to the distance from the point F to the point G. A distance X4 from the peak P4 to the peak P5 corresponds to the distance from the point E to the point F. A distance X5 from the peak P5 to the peak P6 corresponds to the distance from the point D to the point E. Needless to say, the procedures of measuring the four distances on the basis of the line profile of the curved part 100B are repeatedly performed for each straight line S2 in the case of determining the distance D2. A series of distances to be used to determine the distance D2 are measured, following which a median value of the series of measured distances is calculated. As a result, the distance D2 is determined.

To determine the distance D1, for example, in accordance with procedures similar to those in the case of determining the distance D2, a line profile of the flat part 100A is obtained instead of the line profile of the curved part 100B, as illustrated in FIG. 8. Thereafter, the distance D1 is calculated on the basis of the obtained line profile of the flat part 100A.

Specifically, as illustrated in FIG. 8, the peaks P7 to P18 derive from the negative electrode current collector 21 present at the points K, S, T, U, V, W, R, Q, P, O, N, and J, and the peaks P0 derive from the presence of the positive electrode active material layer 12 (lithium cobalt oxide which is a lithium-containing compound). A distance from the point J to the point N (a distance Y10 from the peak P17 to the peak P18), a distance from the point N to the point O (a distance Y9 from the peak P16 to the peak P17), a distance from the point O to the point P (a distance Y8 from the peak P15 to the peak P16), a distance from the point P to the point Q (a distance Y7 from the peak P14 to the peak P15), a distance from the point Q to the point R (a distance Y6 from the peak P13 to the peak P14), a distance from the point K to the point S (a distance Y1 from the peak P7 to the peak P8), a distance from the point S to the point T (a distance Y2 from the peak P8 to the peak P9), a distance from the point T to the point U (a distance Y3 from the peak P9 to the peak P10), a distance from the point U to the point V (a distance Y4 from the peak P10 to the peak P11), and a distance from the point V to the point W (a distance Y5 from the peak P11 to the peak P12) are measured on the basis of the line profile of the flat part 100A. Needless to say, the procedures of measuring the ten distances on the basis of the line profile of the flat part 100A are repeatedly performed for each straight line S3 in the case of determining the distance D1. A series of distances are measured, following which a median value of the series of measured distances is calculated. As a result, the distance D1 is determined.

As can be appreciated from the procedures of measuring the distances D1 and D2 described above, the distances D1 and D2 measured respectively on the basis of the line profiles of the flat part 100A and the curved part 100B are each more specifically a distance from one to the other of the two mutually adjacent peak tops, i.e., a distance from a center position of one of two mutually adjacent parts of the negative electrode current corrector 21 to a center position of the other of the two mutually adjacent parts of the negative electrode current collector 21.

For example, upon charging the secondary battery, lithium ions are extracted from the positive electrode 10, and the extracted lithium ions are inserted into the negative electrode 20 via the electrolytic solution. For example, upon discharging the secondary battery, lithium ions are extracted from the negative electrode 20, and the extracted lithium ions are inserted into the positive electrode 10 via the electrolytic solution.

The secondary battery is manufactured by the following procedures, for example. FIG. 9 illustrates a planar configuration corresponding to the configuration illustrated in FIG. 3 to describe a method of forming the wound electrode body 100.

First, the positive electrode active material is mixed with materials including, without limitation, the positive electrode binder and the positive electrode conductor on an as-needed basis to thereby obtain a positive electrode mixture. Thereafter, the positive electrode mixture is dispersed into a solvent such as an organic solvent to thereby obtain a paste positive electrode mixture slurry. Lastly, the positive electrode mixture slurry is applied on both surfaces of the positive electrode current collector 11, following which the applied positive electrode mixture slurry is dried to thereby form the positive electrode active material layers 12 including the inner layer 12A and the outer layer 12B. As a result, the positive electrode 10 is fabricated. In this case, respective ranges over which the inner layer 12A and the outer layer 12B are to be formed are adjusted to provide the positive electrode 10 with the non-provision parts 11S and 11E. Thereafter, the positive electrode active material layers 12 may be compression-molded by means of a machine such as a roll pressing machine. In this case, the positive electrode active material layers 12 may be heated. The positive electrode active material layers 12 may be compression-molded a plurality of times.

The negative electrode active material layers 22 including the inner layer 22A and the outer layer 22B are formed on both surfaces of the negative electrode current collector 21 by a procedure similar to the fabrication procedure of the positive electrode 10 described above. Specifically, the negative electrode active material is mixed with materials including, without limitation, the negative electrode binder and the negative electrode conductor on an as-needed basis to thereby obtain a negative electrode mixture. Thereafter, the negative electrode mixture is dispersed into a solvent such as an organic solvent to thereby obtain a paste negative electrode mixture slurry. Thereafter, the negative electrode mixture slurry is applied on both surfaces of the negative electrode current collector 21, following which the applied negative electrode mixture slurry is dried to thereby form the negative electrode active material layers 22. As a result, the negative electrode 20 is fabricated. In this case, respective ranges over which the inner layer 22A and the outer layer 22B are to be formed are adjusted to provide the negative electrode 20 with the non-provision parts 21S and 21E. Thereafter, the negative electrode active material layers 22 may be compression-molded.

An electrolyte salt is added to a solvent, following which the solvent is stirred. The electrolyte salt is thereby dissolved or dispersed in the solvent. As a result, the electrolytic solution is prepared.

First, the positive electrode lead 2 is coupled to the positive electrode current collector 11 by a method such as a welding method, and the negative electrode lead 3 is coupled to the negative electrode current collector 21 by a method such as a welding method. Thereafter, the positive electrode 10 and the negative electrode 20 are stacked on each other with the separator 30 interposed therebetween, to thereby obtain a stacked body 200 as illustrated in FIG. 9.

Thereafter, the stacked body 200 is wound by means of the jig 300 adapted for winding. The jig 300 is to be used to wind the stacked body 200 in such a manner that a section perpendicular to the winding axis J has an elongated shape. The jig 300 includes the flat part 300A corresponding to the flat part 100A and the pair of curved parts 300B corresponding to the pair of curved parts 100B. In a case of winding the stacked body 200 by means of the jig 300, the jig 300 is rotated counterclockwise about a rotational axis R corresponding to the winding axis J, thereby winding the stacked body 200 around the jig 300. This causes the stacked body 200 to be wound along a surface of the jig 300, shaping the stacked body 200 in accordance with the sectional shape, i.e., the elongated shape, of the jig 300. As a result, a wound body 210 including the flat part 100A and the pair of curved parts 100B is formed. The wound body 210 has a configuration similar to the configuration of the wound electrode body 100 except that the wound body 210 is not yet impregnated with the electrolytic solution.

In the process of winding the stacked body 200 by means of the jig 300 in this case, a rotation speed of the jig 300 is appropriately varied, thereby causing the force of tightening the stacked body 200 to be greater in the pair of curved parts 100B than in the flat part 100A. Specifically, the rotation speed of the jig 300 is made relatively lower in the flat part 100A, and is made relatively higher in the pair of curved parts 100B, in the process of winding the stacked body 200. This makes the force of tightening the stacked body 200 relatively greater in the pair of curved parts 100B than in the flat part 100A regarding the wound body 210 formed by the process of winding the stacked body 200. Accordingly, two mutually adjacent parts of the negative electrode current collector 21 in the pair of curved parts 100B are closer to each other than two mutually adjacent parts of the negative electrode current collector 21 in the flat part 100A. That is, the appropriate adjustment of the rotation speed of the jig 300 varies each of the distances D1 and D2, allowing for control of the distance ratio D2/D1, as described above.

Thereafter, the outer package member 1 is folded in such a manner as to sandwich the wound body 210, following which the outer edges of the outer package member 1 excluding the outer edge at one piece of the outer package member 1 are bonded to each other by a method such as a thermal fusion bonding method. The wound body 210 is thereby contained in the pouch-shaped outer package member 1. In this case, the sealing film 4 is interposed between the positive electrode lead 2 and the outer package member 1, and the sealing film 4 is interposed between the negative electrode lead 3 and the outer package member 1. Lastly, the electrolytic solution is injected into the pouch-shaped outer package member 1, following which the outer package member 1 is sealed by a method such as a thermal fusion bonding method. This causes the wound body 210 to be impregnated with the electrolytic solution. As a result, the wound electrode body 100 is formed. Thus, the wound electrode body 100 is sealed in the outer package member 1. As a result, the secondary battery is completed.

According to the secondary battery, the wound electrode body 100 having the elongated section perpendicular to the winding axis J has the width W, the wound-layer number N, and the distance ratio D2/D1 that satisfy Condition A described above or Condition B described above. In this case, as described above, the confining force resulting from the tightening upon winding is greater in the curved part 100B than in the flat part 100A, and the physical strength is also greater in the curved part 100B than in the flat part 100A, suppressing swelling of the wound electrode body 100 in the width direction upon charging and discharging. This suppresses swelling of the secondary battery while securing a discharge capacity upon charging and discharging. Accordingly, it is possible to achieve superior battery characteristics.

In particular, the distance ratio D2/D1 may be equal to or greater than 0.930. This suppresses the swelling of the wound electrode body 100 also in the thickness direction upon charging, making it possible to achieve higher effects.

Further, the negative electrode 20 may include natural graphite, artificial graphite, or both. This achieves a high discharge capacity, making it possible to achieve higher effects accordingly. In this case, the negative electrode 20 may include one or more of the simple substance of silicon, the silicon compound, and the silicon alloy. This allows for an increase in discharge capacity, making it possible to achieve further higher effects accordingly.

The configuration of the secondary battery described above is appropriately modifiable. It should be understood that any two or more of the following series of modifications may be combined.

Specifically, the wound-layer number N of the wound electrode body 100 may be changed to any number. That is, although FIGS. 5 and 6 each describe the case where the wound-layer number N is 11, the wound-layer number N may be set to any number as long as the wound-layer number N has a value that is specified in Condition A or Condition B.

Moreover, in order to set the distance ratio D2/D1 to fall within an appropriate range that is specified in Condition A or Condition B, although the rotation speed of the jig 300 has been varied upon formation of the wound electrode body 100, or upon winding of the stacked body 200, the method of controlling the distance ratio D2/D1 is not particularly limited. That is, any method other than the method of varying the rotation speed of the jig 300 may be used as long as the method allows for control to cause the distance D2/D1 to fall within the appropriate range.

The applications of the secondary battery are not particularly limited as long as they are, for example, machines, apparatuses, instruments, devices, or systems (assembly of a plurality of apparatuses, for example) in which the secondary battery is usable as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be, for example, used in place of the main power source, or may be switched from the main power source on an as-needed basis. In a case where the secondary battery is used as the auxiliary power source, the kind of the main power source is not limited to the secondary battery.

Examples of the applications of the secondary battery include: electronic apparatuses including portable electronic apparatuses; portable life appliances; storage devices; electric power tools; battery packs mountable on laptop personal computers or other apparatuses as a detachable power source; medical electronic apparatuses; electric vehicles; and electric power storage systems. Examples of the electronic apparatuses include video cameras, digital still cameras, mobile phones, laptop personal computers, cordless phones, headphone stereos, portable radios, portable televisions, and portable information terminals. Examples of the portable life appliances include electric shavers. Examples of the storage devices include backup power sources and memory cards. Examples of the electric power tools include electric drills and electric saws. Examples of the medical electronic apparatuses include pacemakers and hearing aids. Examples of the electric vehicles include electric automobiles including hybrid automobiles. Examples of the electric power storage systems include home battery systems for accumulation of electric power for emergency. Needless to say, the lithium-ion secondary battery may have applications other than those described above.

The battery pack may use a single battery or an assembled battery, as will be described later. The electric vehicle operates or runs using the secondary battery as a driving power source. The electric vehicle may be an automobile, such as a hybrid electric vehicle (HEV), that also includes a drive source other than the secondary battery, as described above. The electric power storage system uses the secondary battery as an electric power storage source. For example, a home electric power storage system accumulates electric power in the secondary battery serving as the electric power storage source, and the accumulated electric power allows for use of a home electric product. The electric power tool includes a movable unit, such as a drill, that is movable with use of the secondary battery as a driving power source. The electronic apparatus executes various functions with use of the secondary battery as a driving power source or an electric power supply source.

Hereinafter, specific description is given of some application examples of the secondary battery. Configurations of the respective application examples described below are mere examples, and may be changed as appropriate.

FIG. 10 is a perspective view of a configuration of a battery pack using a single battery. FIG. 11 illustrates a block configuration of the battery pack illustrated in FIG. 10. It should be understood that FIG. 10 illustrates an exploded state of the battery pack.

The battery pack described here is a simple battery pack using a single secondary battery, i.e., a so-called soft pack, and is mounted on, for example, an electronic apparatus such as a smartphone. Referring to FIG. 10, the battery pack includes, for example, an electric power source 111 and a circuit board 116 coupled to the electric power source 111. The electric power source 111 is a laminated secondary battery. A positive electrode lead 112 and a negative electrode lead 113 are attached to the electric power source 111.

The electric power source 111 has side surfaces to which a pair of adhesive tapes 118 and 119 are adhered. The circuit board 116 is provided with a protection circuit module (PCM). The circuit board 116 is coupled to the positive electrode lead 112 with a tab 114 interposed therebetween, and is coupled to the negative electrode lead 113 with a tab 115 interposed therebetween. The circuit board 116 is also coupled to a lead 117 provided with a connector for external connection. The circuit board 116 coupled to the electric power source 111 is protected by a label 120 and an insulating sheet 121.

The battery pack includes the electric power source 111 and the circuit board 116, for example, as illustrated in FIG. 11. The circuit board 116 includes, for example, a controller 121A, a switch unit 122, a PTC device 123, and a temperature detector 124. The electric power source 111 is able to be coupled to outside via a positive electrode terminal 125 and a negative electrode terminal 127, and is therefore charged and discharged via the positive electrode terminal 125 and the negative electrode terminal 127. The temperature detector 124 detects a temperature with use of a temperature detection terminal 126, i.e., a so-called T terminal. It should be understood that the circuit board 116 may not include the PTC device 123, and a separate PTC device may be provided to the circuit board 116.

The controller 121A includes, for example but not limited to, a central processing unit (CPU) and a memory. The controller 121A controls operation of the battery pack as a whole. For example, when a battery voltage reaches an overcharge detection voltage, the controller 1221A turns off the switch unit 122 to prevent a charge current from flowing into a current path of the electric power source 111. For example, when a large current flows during charging, the controller 121 turns off the switch unit 122 to block the charge current. The overcharge detection voltage is not particularly limited, and is, for example, 4.2 V±0.05 V. For example, when a battery voltage reaches an overdischarge detection voltage, the controller 121A turns off the switch unit 122 to prevent a discharge current from flowing into the current path of the electric power source 111. For example, when a large current flows during discharging, the controller 121A turns off the switch unit 122 to block the discharge current. The overdischarge detection voltage is not particularly limited, and is, for example, 2.4 V±0.1 V.

The switch unit 122 includes, for example but not limited to, a charge control switch and a discharge control switch. The switch unit 122 switches a used state of the electric power source 111 in accordance with an instruction from the controller 121A. The used state of the electric power source 111 is, for example, whether the electric power source 111 is coupled to an external apparatus. The charge control switch and the discharge control switch are each, for example, a semiconductor switch such as a metal-oxide-semiconductor field-effect transistor (MOSFET). The charge current and the discharge current are detected, for example, on the basis of an on-resistance of the switch unit 122.

The temperature detector 124 includes, for example, a temperature detection device such as a thermistor. The temperature detector 124 measures a temperature of the electric power source 111, and supplies a result of the measurement of the temperature to the controller 121A.

Figure 12:
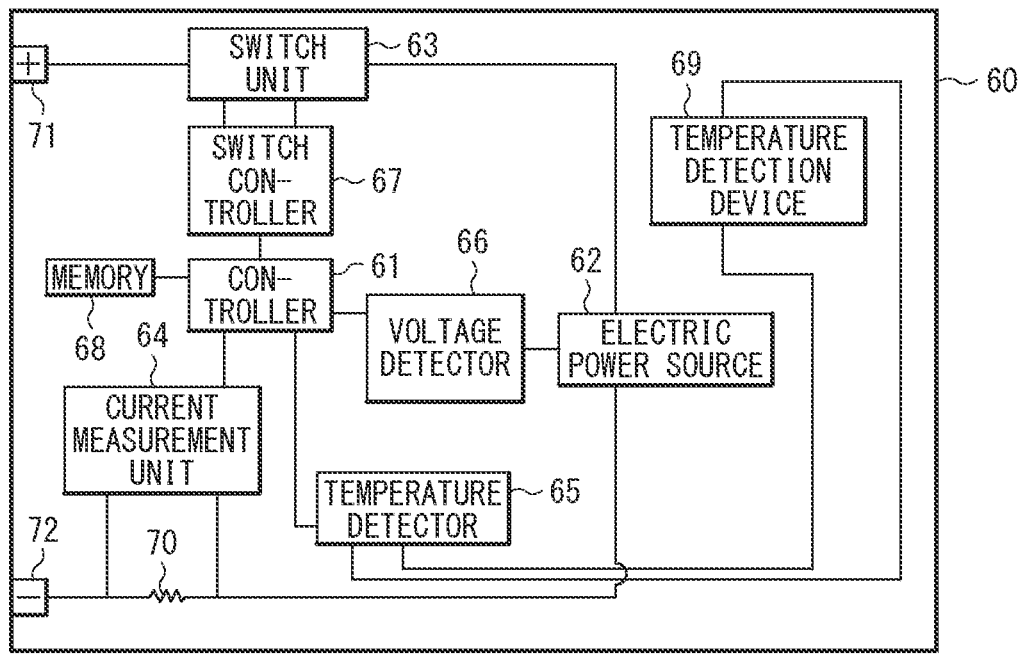
FIG. 12 is a block diagram illustrating a configuration of an application example (a battery pack: an assembled battery) of the secondary battery according to an embodiment of the present technology.

FIG. 12 illustrates a block configuration of a battery pack using an assembled battery. The battery pack includes, for example, a controller 61, an electric power source 62, a switch unit 63, a current measurement unit 64, a temperature detector 65, a voltage detector 66, a switch controller 67, a memory 68, a temperature detection device 69, a current detection resistance 70, a positive electrode terminal 71, and a negative electrode terminal 72 that are contained in a housing 60.

The controller 61 includes, for example but not limited to, a CPU. The controller 61 controls operation of the battery pack as a whole. The electric power source 62 is an assembled battery that includes two or more secondary batteries. The secondary batteries may be coupled in series, in parallel, or in series-parallel combination. To give an example, the electric power source 62 includes six secondary batteries in which two sets of three series-coupled batteries are coupled in parallel to each other.

The switch unit 63 includes, for example but not limited to, a charge control switch, a discharge control switch, a charging diode, and a discharging diode. The switch unit 63 switches a used state of the electric power source 62 in accordance with an instruction from the controller 61. The used state of the electric power source 62 is, for example, whether the electric power source 62 is coupled to an external apparatus. The charge control switch and the discharge control switch are each, for example, the semiconductor switch described above.

The current measurement unit 64 measures a current with use of the current detection resistance 70, and supplies a result of the measurement of the current to the controller 61. The temperature detector 65 measures a temperature with use of the temperature detection device 69, and supplies a result of the measurement of the temperature to the controller 61. The voltage detector 66 measures a voltage of the electric power source 62, i.e., of the secondary batteries, and supplies, to the controller 61, a result of the measurement of the voltage having been subjected to analog-to-digital conversion.

The switch controller 67 controls operation of the switch unit 63 in accordance with respective signals supplied from the current measurement unit 64 and the voltage detector 66. For example, when a battery voltage reaches an overcharge detection voltage, the switch controller 67 turns off the switch unit 63, or the charge control switch, to prevent a charge current from flowing into a current path of the electric power source 62. The overcharge detection voltage is not particularly limited, and is, for example, 4.2 V±0.05 V. This allows for only discharging via the discharging diode in the electric power source 62. This also causes the switch controller 67 to block the charge current when, for example, a large current flows during charging. For example, when a battery voltage reaches an overdischarge detection voltage, the switch controller 67 turns off the switch unit 63, or the discharge control switch, to prevent a discharge current from flowing into the current path of the electric power source 62. The overdischarge detection voltage is not particularly limited, and is, for example, 2.4 V±0.1 V. This allows for only charging via the charging diode in the electric power source 62. This also causes the switch controller 67 to block the discharge current, for example, when a large current flows during discharging.

The memory 68 includes, for example but not limited to, an EEPROM that is a non-volatile memory. The temperature detection device 69 includes, for example but not limited to, a thermistor. The temperature detection device 69 measures a temperature of the electric power source 62, and supplies a result of the measurement of the temperature to the controller 61. The positive electrode terminal 71 and the negative electrode terminal 72 are each to be coupled to an external apparatus, examples of which include an external apparatus that operates with use of the battery pack and an external apparatus to be used to charge the battery pack. Examples of the external apparatus that operates with use of the battery pack include a laptop personal computer. Examples of the external apparatus to be used to charge the battery pack include a battery charger. The electric power source 62 is charged and discharged via the positive electrode terminal 71 and the negative electrode terminal 72.

Figure 13:
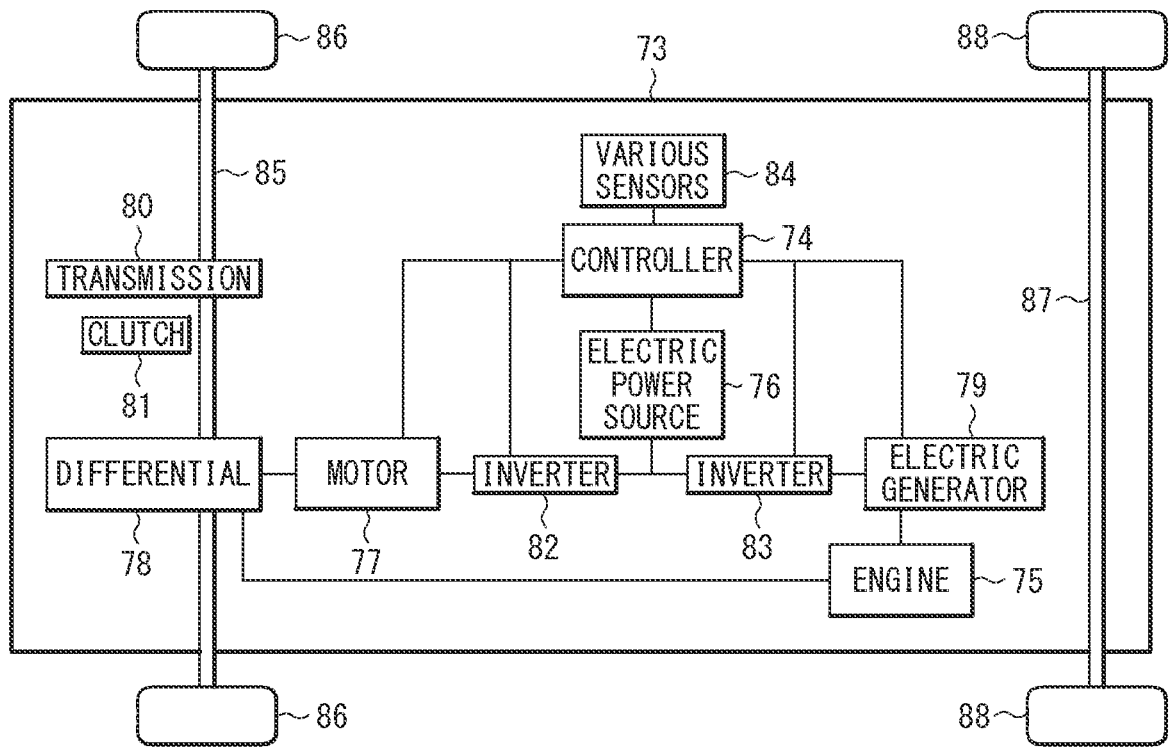
FIG. 13 is a block diagram illustrating a configuration of an application example (an electric vehicle) of the secondary battery according to an embodiment of the present technology.

FIG. 13 illustrates a block configuration of a hybrid electric vehicle (HEV) that is an example of an electric vehicle. The HEV includes, for example, a controller 74, an engine 75, an electric power source 76, a driving motor 77, a differential 78, an electric generator 79, a transmission 80, a clutch 81, inverters 82 and 83, and various sensors 84 that are contained in a housing 73. In addition thereto, the HEV includes, for example, a front drive shaft 85, front wheels 86, a rear drive shaft 87, and rear wheels 88. The front drive shaft 85 and the front wheels 86 are coupled to the differential 78 and the transmission 80.

The HEV described here is configured to run, for example, with use of one of the engine 75 and the motor 77 as a drive source. The engine 75 is a main power source, and is, for example, a petrol engine. In a case where the engine 75 is used as the power source, driving force (torque) of the engine 75 is transmitted to the front wheels 86 and the rear wheels 88, for example, via the differential 78, the transmission 80, and the clutch 81 that are drive units. The torque of the engine 75 is transmitted to the electric generator 79. The electric generator 79 generates alternating-current electric power with use of the received torque. The inverter 83 converts the generated alternating-current electric power into direct-current electric power, and the direct-current electric power is stored in the electric power source 76. In a case where the motor 77, which is a converter, is used as the power source, the inverter 82 converts electric power (direct-current electric power) supplied from the electric power source 76 into alternating-current electric power, and the motor 77 is therefore driven with use of the alternating-current electric power. Driving force (torque) derived from the conversion of the electric power from the motor 77 is transmitted, for example, to the front wheels 86 and the rear wheels 88, for example, via the differential 78, the transmission 80, and the clutch 81 that are the drive units (drivers).

Upon deceleration of the HEV by a brake mechanism, resistance at the time of the deceleration is transmitted to the motor 77 as torque. The motor 77 may generate alternating-current electric power with use of the received torque. The inverter 82 converts the alternating-current electric power into direct-current electric power. It is preferable that the direct-current regenerative electric power be accumulated in the electric power source 76.

The controller 74 includes, for example but not limited to, a CPU. The controller 74 controls operation of the HEV as a whole. The electric power source 76 includes one or more secondary batteries. The electric power source 76 is allowed to be coupled to an external electric power source. The various sensors 84 include, for example, one or more of sensors including, without limitation, a speed sensor, an acceleration sensor, and an engine speed sensor. The various sensors 84 are used to control the speed of the engine 75 and to control an angle of a throttle valve (a throttle angle).

Although the description has been given with reference to an example case where the electric vehicle is the HEV, the electric vehicle may be: a vehicle (an electric automobile) that operates with use of only the electric power source 76 and the motor 77 and without using the engine 75; a plug-in hybrid electric vehicle (PHEV) additionally provided with an external charging function; a hydrogen fuel cell vehicle (FCV); or any other vehicle.

Figure 14:
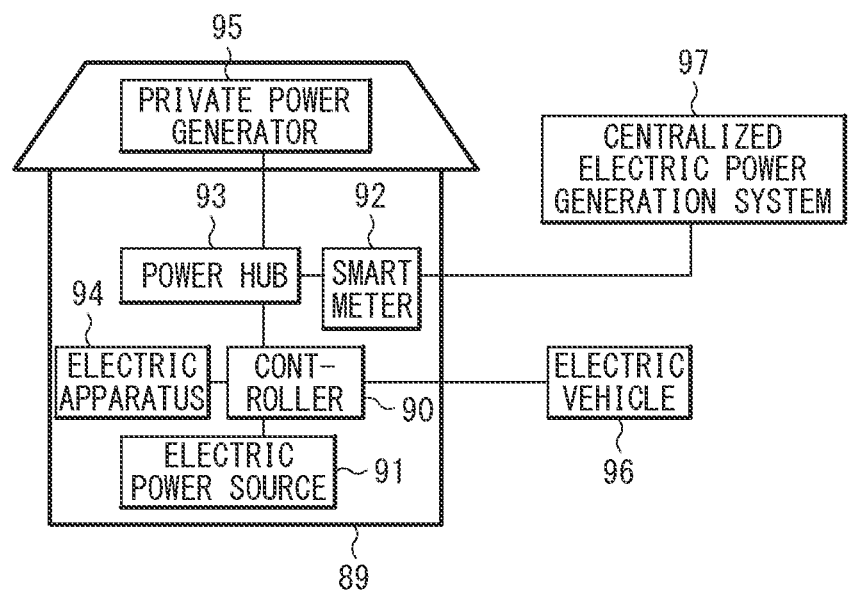
FIG. 14 is a block diagram illustrating a configuration of an application example (an electric power storage system) of the secondary battery according to an embodiment of the present technology.

FIG. 14 illustrates a block configuration of an electric power storage system. The electric power storage system includes, for example, a controller 90, an electric power source 91, a smart meter 92, and a power hub 93 that are provided in a building 89. Examples of the building 89 include a general residence and a commercial building. The electric power storage system may be provided for each household (each family unit), or may be provided for a plurality of households (a plurality of family units).

Here, for example, the electric power source 91 is coupled to an electric apparatus 94 provided inside the building 89 and is allowed to be coupled to an electric vehicle 96 parked outside the building 89. Further, for example, the electric power source 91 is coupled to a private power generator 95 provided in the building 89 via the power hub 93, and is allowed to be coupled to an outside centralized electric power generation system 97 via the smart meter 92 and the power hub 93.

The electric apparatus 94 includes, for example, one or more of home electric products, examples of which include a refrigerator, an air conditioner, a television, and a water heater. The private power generator 95 includes, for example, one or more of generators, examples of which include a solar power generator and a wind power generator. The electric vehicle 96 includes, for example, one or more of vehicles, examples of which include an electric automobile, an electric motorcycle, and a hybrid electric automobile. The centralized electric power generation system 97 includes, for example, one or more of power plants, example of which include a thermal power plant, an atomic power plant, a hydraulic power plant, and a wind power plant.

The controller 90 includes, for example but not limited to, a CPU. The controller 90 controls operation of the electric power storage system as a whole. The electric power source 91 includes one or more secondary batteries. The smart meter 92 is, for example, an electric power meter that is compatible with a network. The smart meter 92 is provided in the building 89 demanding electric power, and is communicable with an electric power supplier, for example.

The electric power storage system accumulates, for example, electric power from the centralized electric power generation system 97, which is an external electric power source, into the electric power source 91 via the smart meter 92 and the power hub 93, and accumulates electric power from the private power generator 95, which is an independent electric power source, into the electric power source 91 via the power hub 93. The electric power accumulated in the electric power source 91 is supplied to the electric apparatus 94 and the electric vehicle 96 in accordance with an instruction from the controller 90. This allows the electric apparatus 94 to operate, and allows the electric vehicle 96 to be charged.

Figure 15:
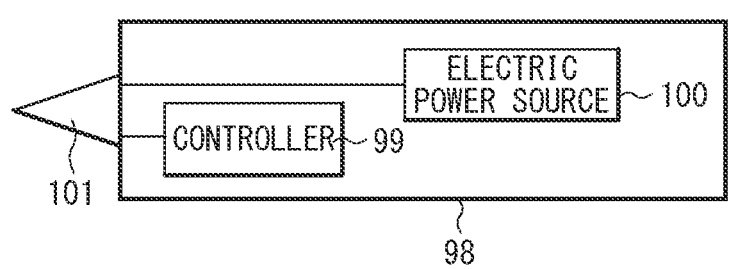
FIG. 15 is a block diagram illustrating a configuration of an application example (an electric power tool) of the secondary battery according to an embodiment of the present technology.

FIG. 15 illustrates a block configuration of an electric power tool. The electric power tool described here is, for example, an electric drill. The electric power tool includes, for example, a controller 99 and an electric power source 100 that are contained in a tool body 98. A drill unit 101, which is a movable unit, is operably or rotatably attached to the tool body 98, for example. The controller 99 includes, for example but not limited to, a CPU. The controller 99 controls operation of the electric power tool as a whole. The electric power source 100 includes one or more secondary batteries. The controller 99 causes electric power to be supplied from the electric power source 100 to the drill unit 101 in accordance with operation performed on an operation switch.

EXAMPLES

A description is given of Examples of the technology below.

Experiment Examples 1-1 to 1-132

The secondary batteries were fabricated, and their respective battery characteristics were evaluated as described below.

First, the laminated secondary batteries (lithium-ion secondary batteries) illustrated in FIGS. 1 to 4 were fabricated by the following procedures.

In a case of fabricating the positive electrode 10, first, 91 parts by mass of the positive electrode active material ($LiCoO_2$), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby obtain a paste positive electrode mixture slurry. Thereafter, the positive electrode mixture slurry was applied on both surfaces of the positive electrode current collector 11 (an aluminum foil having a thickness of 12 μm) by means of a coating device, following which the applied positive electrode mixture slurry was dried to thereby form the positive electrode active material layers 12, i.e., the inner layer 12A and the outer layer 12B. In this case, the respective ranges over which the inner layer 12A and the outer layer 12B were to be formed were adjusted, as illustrated in FIG. 2. Lastly, the positive electrode active material layers 12 were compression-molded by means of a roll pressing machine.

In a case of fabricating the positive electrode 10, the thickness (μm) and the area density ($mg/cm^2$) of the positive electrode active material layers 12 were set as described in Tables 1 to 11. Here, the thickness represents the thickness of each of the inner layer 12A and the outer layer 12B, and the area density represents an area density of the inner layer 12A and the outer layer 12B in combination.

In a case of fabricating the negative electrode 20, first, 95 parts by mass of the negative electrode active material (artificial graphite, which was the carbon material) and 5 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby obtain a paste negative electrode mixture slurry. Thereafter, the negative electrode mixture slurry was applied on both surfaces of the negative electrode current collector 21 (a copper foil having a thickness of 8 μm) by means of a coating device, following which the applied negative electrode mixture slurry was dried to thereby form the negative electrode active material layers 22, i.e., the inner layer 22A and the outer layer 22B. In this case, the respective ranges over which the inner layer 22A and the outer layer 22B were to be formed were adjusted, as illustrated in FIG. 2. Lastly, the negative electrode active material layers 22 were compression-molded by means of a roll pressing machine.

In the case of fabricating the negative electrode 20, the thickness (μm) and the area density ($mg/cm^2$) of each of the negative electrode active material layers 22 were set as described in Tables 1 to 11. Here, the thickness represents a thickness of each of the inner layer 22A and the outer layer 22B, and the area density represents an area density of the inner layer 22A and the outer layer 22B in combination.

In a case of preparing the electrolytic solution, the electrolyte salt (lithium hexafluorophosphate) was added to a solvent (ethylene carbonate and ethyl methyl carbonate), following which the solvent was stirred. In this case, a mixture ratio (a weight ratio) of ethylene carbonate/ethyl methyl carbonate in the solvent was set to 50:50, and the content of the electrolyte salt with respect to the solvent was set to 1 mol/kg.

In a case of assembling the secondary battery, first, the positive electrode lead 2 including aluminum was welded to the positive electrode 10, specifically, to the positive electrode current collector 11, and the negative electrode lead 3 including copper was welded to the negative electrode, specifically, to the negative electrode current collector 21. Thereafter, the positive electrode 10 and the negative electrode 20 were stacked on each other with the separator 30 (a fine-porous polyethylene film having a thickness of 15 μm) interposed therebetween to thereby obtain the stacked body 200.

Thereafter, by the procedure illustrated in FIG. 9, the jig 300 was rotated about the rotational axis R, thereby winding the stacked body 200 about the winding axis J in accordance with the rotation of the jig 300, following which a protective tape was attached to the outermost periphery of the stacked body 200 to thereby obtain the wound body 210.

In this case, the wound-layer number N was set as described in Tables 1 to 11. Further, the rotation speed of the jig 300 was adjusted in the process of winding the stacked body 200, thereby varying each of the distances D1 and D2 and the distance ratio D2/D1, as described in Tables 1 to 11.

Thereafter, the outer package member 1 (including a nylon film having a thickness of 25 μm as a surface protective layer, an aluminum foil having a thickness of 40 μm as a metal layer, and a polypropylene film having a thickness of 30 μm as a fusion-bonding layer) was folded in such a manner as to sandwich the wound body 210, following which the outer edges of two sides of the outer package member 1 were thermal fusion bonded to each other. In this case, the sealing film 4 (a polypropylene film having a thickness of 15 μm) was interposed between the outer package member 1, the positive electrode lead 2, and the outer package member 1, and the sealing film 5 (a polypropylene film having a thickness of 15 μm) was interposed between the outer package member 1 and the negative electrode lead 4. Lastly, the electrolytic solution was injected into the outer package member 1 to thereby impregnate the wound body 210 with the electrolytic solution, and thereafter, the outer edges of one of the remaining sides of the outer package member 1 were thermal fusion bonded to each other in a reduced-pressure environment.

Thus, the wound electrode body 100 was formed, being sealed in the outer package member 1. As a result, the laminated secondary battery was completed. In this case, the width W (μm) and the height H (μm) of the wound electrode body 100 were each set as described in Tables 1 to 11.

Examination of battery characteristics (a swelling characteristic and a cyclability characteristic) of the secondary batteries revealed the results described in Tables 1 to 11.

In a case of examining the swelling characteristic, first, the secondary battery was charged and discharged for one cycle in an ambient temperature environment (at a temperature of 23° C.) in order to stabilize a state of the secondary battery. Upon the charging, the secondary battery was charged with a constant current of 1 C until a voltage reached 4.4 V, and was thereafter charged with a constant voltage of 4.4 V until a current reached 0.05 C. Upon the discharging, the secondary battery was discharged with a constant current of 1 C until the voltage reached 3.0 V. "1 C" is a value of a current that causes a battery capacity (a theoretical capacity) to be completely discharged in 1 hour. "0.05 C" is a value of a current that causes the battery capacity to be completely discharged in 20 hours.

Thereafter, the secondary battery was charged and discharged for another cycle in the same environment, and the thickness T (mm) of the wound electrode body 100 at the second cycle was measured. Charging and discharging conditions at the second cycle were similar to those at the first cycle described above.

Thereafter, the secondary battery was charged and discharged for another 500 cycles in the same environment, and the thickness T (mm) of the wound electrode body 100 at the 502nd cycle was measured. Charging and discharging conditions were similar to those at the first cycle described above, except that the current at the time of charging was changed to 0.7 C and the current at the time of discharging was changed to 0.7 C. "0.7 C" is a value of a current that causes the battery capacity to be completely discharged in 10/7 hours.

Lastly, a swelling rate of the secondary battery was calculated on the basis of a calculation formula: a swelling rate (%)=[(502nd-cycle thickness T−second-cycle thickness T)/second-cycle thickness T]×100.

In a case of examining the cyclability characteristic, in the above-described procedures of examining the swelling characteristic, the discharge capacity (the second-cycle discharge capacity) of the secondary battery was measured after the secondary battery was charged and discharged for two cycles, and the discharge capacity (the 502nd-cycle discharge capacity) of the secondary battery was measured after the secondary battery was further charged and discharged for 500 cycles. Thereafter, a retention rate of the secondary battery was calculated on the basis of a calculation formula: a retention rate (%)=(502nd-cycle discharge capacity/second-cycle discharge capacity)×100.

TABLE 1

(Negative electrode active material: Artificial graphite)

| Experiment example | Wound electrode body | | | | | | Positive electrode active material layer | | Negative electrode active material layer | | Swelling rate (%) | Retention rate (%) |
| | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | | |
| --- | --- | --- | --- | --- | --- | --- | --- | --- | --- | --- | --- | --- |
| 1-1  | 10 | 120 | 11 | 283.6 | 286.4 | 1.010 | 51.5 | 37.0 | 63 | 20.0 | 6.8 | 80 |
| 1-2  | 10 | 120 | 11 | 285.1 | 282.2 | 0.990 | 51.5 | 37.0 | 63 | 20.0 | 6.8 | 81 |
| 1-3  | 10 | 120 | 11 | 284.2 | 281.1 | 0.989 | 51.5 | 37.0 | 63 | 20.0 | 6.9 | 82 |
| 1-4  | 10 | 120 | 11 | 283.3 | 269.1 | 0.950 | 51.5 | 37.0 | 63 | 20.0 | 6.9 | 81 |
| 1-5  | 10 | 120 | 11 | 285.4 | 265.4 | 0.930 | 51.5 | 37.0 | 63 | 20.0 | 7.0 | 81 |
| 1-6  | 10 | 120 | 11 | 287.0 | 264.0 | 0.920 | 51.5 | 37.0 | 63 | 20.0 | 6.9 | 82 |
| 1-7  | 30 | 120 | 11 | 283.8 | 286.6 | 1.010 | 51.5 | 37.0 | 63 | 20.0 | 6.9 | 81 |
| 1-8  | 30 | 120 | 11 | 284.5 | 281.7 | 0.990 | 51.5 | 37.0 | 63 | 20.0 | 6.8 | 82 |
| 1-9  | 30 | 120 | 11 | 285.9 | 282.8 | 0.989 | 51.5 | 37.0 | 63 | 20.0 | 5.0 | 83 |
| 1-10 | 30 | 120 | 11 | 286.1 | 271.8 | 0.950 | 51.5 | 37.0 | 63 | 20.0 | 5.1 | 84 |
| 1-11 | 30 | 120 | 11 | 286.2 | 266.2 | 0.930 | 51.5 | 37.0 | 63 | 20.0 | 5.1 | 82 |
| 1-12 | 30 | 120 | 11 | 286.9 | 263.9 | 0.920 | 51.5 | 37.0 | 63 | 20.0 | 5.9 | 83 |

TABLE 2

(Negative electrode active material: Artificial graphite)

| Experiment example | Wound electrode body | | | | | | Positive electrode active material layer | | Negative electrode active material layer | | Swelling rate (%) | Retention rate (%) |
| | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | | |
| --- | --- | --- | --- | --- | --- | --- | --- | --- | --- | --- | --- | --- |
| 1-13 | 80 | 120 | 11 | 283.5 | 286.3 | 1.010 | 51.5 | 37.0 | 63 | 20.0 | 6.8 | 81 |
| 1-14 | 80 | 120 | 11 | 284.4 | 281.6 | 0.990 | 51.5 | 37.0 | 63 | 20.0 | 6.9 | 82 |
| 1-15 | 80 | 120 | 11 | 284.9 | 281.8 | 0.989 | 51.5 | 37.0 | 63 | 20.0 | 5.0 | 83 |

TABLE 2-continued (Negative electrode active material: Artificial graphite)

| | Wound electrode body | | | | | Positive electrode active material layer | | Negative electrode active material layer | | | |
|---|---|---|---|---|---|---|---|---|---|---|---|
| Experiment example | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | Swelling rate (%) | Retention rate (%) |
| 1-16 | 80 | 120 | 11 | 283.1 | 268.9 | 0.950 | 51.5 | 37.0 | 63 | 20.0 | 5.1 | 82 |
| 1-17 | 80 | 120 | 11 | 285.6 | 265.6 | 0.930 | 51.5 | 37.0 | 63 | 20.0 | 5.0 | 84 |
| 1-18 | 80 | 120 | 11 | 286.8 | 263.9 | 0.920 | 51.5 | 37.0 | 63 | 20.0 | 5.7 | 82 |
| 1-19 | 120 | 120 | 11 | 283.4 | 286.2 | 1.010 | 51.5 | 37.0 | 63 | 20.0 | 6.9 | 83 |
| 1-20 | 120 | 120 | 11 | 285.1 | 282.2 | 0.990 | 51.5 | 37.0 | 63 | 20.0 | 6.7 | 83 |
| 1-21 | 120 | 120 | 11 | 284.0 | 280.9 | 0.989 | 51.5 | 37.0 | 63 | 20.0 | 5.1 | 83 |
| 1-22 | 120 | 120 | 11 | 285.3 | 271.0 | 0.950 | 51.5 | 37.0 | 63 | 20.0 | 4.9 | 81 |
| 1-23 | 120 | 120 | 11 | 285.7 | 265.7 | 0.930 | 51.5 | 37.0 | 63 | 20.0 | 5.0 | 82 |
| 1-24 | 120 | 120 | 11 | 286.7 | 263.8 | 0.920 | 51.5 | 37.0 | 63 | 20.0 | 5.7 | 81 |

TABLE 3

(Negative electrode active material: Artificial graphite)

| | Wound electrode body | | | | | Positive electrode active material layer | | Negative electrode active material layer | | | |
|---|---|---|---|---|---|---|---|---|---|---|---|
| Experiment example | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | Swelling rate (%) | Retention rate (%) |
| 1-25 | 160 | 120 | 11 | 285.0 | 287.9 | 1.010 | 51.5 | 37.0 | 63 | 20.0 | 6.7 | 84 |
| 1-26 | 160 | 120 | 11 | 284.7 | 281.9 | 0.990 | 51.5 | 37.0 | 63 | 20.0 | 6.9 | 83 |
| 1-27 | 160 | 120 | 11 | 284.8 | 281.7 | 0.989 | 51.5 | 37.0 | 63 | 20.0 | 5.0 | 82 |
| 1-28 | 160 | 120 | 11 | 285.8 | 271.2 | 0.950 | 51.5 | 37.0 | 63 | 20.0 | 5.0 | 82 |
| 1-29 | 160 | 120 | 11 | 285.7 | 265.7 | 0.930 | 51.5 | 37.0 | 63 | 20.0 | 5.2 | 83 |
| 1-30 | 160 | 120 | 11 | 286.7 | 263.8 | 0.920 | 51.5 | 37.0 | 63 | 20.0 | 6.0 | 81 |
| 1-31 | 200 | 120 | 11 | 282.9 | 285.7 | 1.010 | 51.5 | 37.0 | 63 | 20.0 | 7.0 | 81 |
| 1-32 | 200 | 120 | 11 | 284.6 | 281.8 | 0.990 | 51.5 | 37.0 | 63 | 20.0 | 6.8 | 81 |
| 1-33 | 200 | 120 | 11 | 284.9 | 281.8 | 0.989 | 51.5 | 37.0 | 63 | 20.0 | 6.9 | 82 |
| 1-34 | 200 | 120 | 11 | 286.1 | 271.8 | 0.950 | 51.5 | 37.0 | 63 | 20.0 | 6.8 | 81 |
| 1-35 | 200 | 120 | 11 | 286.3 | 266.3 | 0.930 | 51.5 | 37.0 | 63 | 20.0 | 6.9 | 83 |
| 1-36 | 200 | 120 | 11 | 287.0 | 264.0 | 0.920 | 51.5 | 37.0 | 63 | 20.0 | 6.8 | 83 |

TABLE 4

(Negative electrode active material: Artificial graphite)

| | Wound electrode body | | | | | Positive electrode active material layer | | Negative electrode active material layer | | | |
|---|---|---|---|---|---|---|---|---|---|---|---|
| Experiment example | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | Swelling rate (%) | Retention rate (%) |
| 1-37 | 80 | 120 | 7 | 282.1 | 284.9 | 1.010 | 51.5 | 37.0 | 63 | 20.0 | 7.0 | 81 |
| 1-38 | 80 | 120 | 7 | 285.1 | 282.2 | 0.990 | 51.5 | 37.0 | 63 | 20.0 | 6.8 | 82 |
| 1-39 | 80 | 120 | 7 | 284.9 | 281.8 | 0.989 | 51.5 | 37.0 | 63 | 20.0 | 6.9 | 83 |
| 1-40 | 80 | 120 | 7 | 284.4 | 270.2 | 0.950 | 51.5 | 37.0 | 63 | 20.0 | 6.9 | 81 |
| 1-41 | 80 | 120 | 7 | 286.3 | 266.3 | 0.930 | 51.5 | 37.0 | 63 | 20.0 | 6.8 | 82 |
| 1-42 | 80 | 120 | 7 | 286.7 | 263.8 | 0.920 | 51.5 | 37.0 | 63 | 20.0 | 6.8 | 82 |
| 1-43 | 80 | 120 | 8 | 283.4 | 286.2 | 1.010 | 51.5 | 37.0 | 63 | 20.0 | 7.0 | 81 |
| 1-44 | 80 | 120 | 8 | 285.1 | 282.2 | 0.990 | 51.5 | 37.0 | 63 | 20.0 | 6.8 | 81 |
| 1-45 | 80 | 120 | 8 | 284.5 | 281.4 | 0.989 | 51.5 | 37.0 | 63 | 20.0 | 5.0 | 83 |
| 1-46 | 80 | 120 | 8 | 285.0 | 270.8 | 0.950 | 51.5 | 37.0 | 63 | 20.0 | 5.2 | 83 |
| 1-47 | 80 | 120 | 8 | 285.9 | 265.9 | 0.930 | 51.5 | 37.0 | 63 | 20.0 | 5.1 | 82 |
| 1-48 | 80 | 120 | 8 | 286.9 | 263.9 | 0.920 | 51.5 | 37.0 | 63 | 20.0 | 6.0 | 81 |

TABLE 5

(Negative electrode active material: Artificial graphite)

| Experiment example | Wound electrode body | | | | | | Positive electrode active material layer | | Negative electrode active material layer | | Swelling rate (%) | Retention rate (%) |
|---|---|---|---|---|---|---|---|---|---|---|---|---|
| | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | | |
| 1-49 | 80 | 120 | 9 | 283.4 | 286.2 | 1.010 | 51.5 | 37.0 | 63 | 20.0 | 6.8 | 83 |
| 1-50 | 80 | 120 | 9 | 284.6 | 281.8 | 0.990 | 51.5 | 37.0 | 63 | 20.0 | 6.9 | 84 |
| 1-51 | 80 | 120 | 9 | 284.7 | 281.5 | 0.989 | 51.5 | 37.0 | 63 | 20.0 | 4.9 | 82 |
| 1-52 | 80 | 120 | 9 | 286.1 | 271.8 | 0.950 | 51.5 | 37.0 | 63 | 20.0 | 5.1 | 82 |
| 1-53 | 80 | 120 | 9 | 285.7 | 265.7 | 0.930 | 51.5 | 37.0 | 63 | 20.0 | 5.0 | 81 |
| 1-54 | 80 | 120 | 9 | 286.6 | 263.7 | 0.920 | 51.5 | 37.0 | 63 | 20.0 | 6.0 | 83 |
| 1-55 | 80 | 120 | 10 | 282.8 | 285.6 | 1.010 | 51.5 | 37.0 | 63 | 20.0 | 6.9 | 82 |
| 1-56 | 80 | 120 | 10 | 284.9 | 282.1 | 0.990 | 51.5 | 37.0 | 63 | 20.0 | 7.0 | 82 |
| 1-57 | 80 | 120 | 10 | 284.5 | 281.4 | 0.989 | 51.5 | 37.0 | 63 | 20.0 | 4.9 | 82 |
| 1-58 | 80 | 120 | 10 | 286.1 | 271.8 | 0.950 | 51.5 | 37.0 | 63 | 20.0 | 5.1 | 83 |
| 1-59 | 80 | 120 | 10 | 285.7 | 265.7 | 0.930 | 51.5 | 37.0 | 63 | 20.0 | 5.1 | 83 |
| 1-60 | 80 | 120 | 10 | 286.8 | 263.9 | 0.920 | 51.5 | 37.0 | 63 | 20.0 | 5.9 | 84 |

TABLE 6

(Negative electrode active material: Artificial graphite)

| Experiment example | Wound electrode body | | | | | | Positive electrode active material layer | | Negative electrode active material layer | | Swelling rate (%) | Retention rate (%) |
|---|---|---|---|---|---|---|---|---|---|---|---|---|
| | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | | |
| 1-61 | 80 | 120 | 15 | 284.1 | 286.9 | 1.010 | 51.5 | 37.0 | 63 | 20.0 | 6.9 | 81 |
| 1-62 | 80 | 120 | 15 | 283.5 | 280.7 | 0.990 | 51.5 | 37.0 | 63 | 20.0 | 6.9 | 81 |
| 1-63 | 80 | 120 | 15 | 286.1 | 283.0 | 0.989 | 51.5 | 37.0 | 63 | 20.0 | 5.0 | 82 |
| 1-64 | 80 | 120 | 15 | 285.9 | 271.6 | 0.950 | 51.5 | 37.0 | 63 | 20.0 | 5.0 | 82 |
| 1-65 | 80 | 120 | 15 | 284.8 | 264.9 | 0.930 | 51.5 | 37.0 | 63 | 20.0 | 5.1 | 81 |
| 1-66 | 80 | 120 | 15 | 286.8 | 263.9 | 0.920 | 51.5 | 37.0 | 63 | 20.0 | 5.9 | 82 |
| 1-67 | 80 | 120 | 17 | 283.9 | 286.7 | 1.010 | 51.5 | 37.0 | 63 | 20.0 | 6.9 | 81 |
| 1-68 | 80 | 120 | 17 | 282.9 | 280.1 | 0.990 | 51.5 | 37.0 | 63 | 20.0 | 6.8 | 81 |
| 1-69 | 80 | 120 | 17 | 284.6 | 281.5 | 0.989 | 51.5 | 37.0 | 63 | 20.0 | 5.0 | 82 |
| 1-70 | 80 | 120 | 17 | 285.5 | 271.2 | 0.950 | 51.5 | 37.0 | 63 | 20.0 | 5.1 | 82 |
| 1-71 | 80 | 120 | 17 | 286.1 | 266.1 | 0.930 | 51.5 | 37.0 | 63 | 20.0 | 5.1 | 83 |
| 1-72 | 80 | 120 | 17 | 286.9 | 263.9 | 0.920 | 51.5 | 37.0 | 63 | 20.0 | 5.8 | 82 |

TABLE 7

(Negative electrode active material: Artificial graphite)

| Experiment example | Wound electrode body | | | | | | Positive electrode active material layer | | Negative electrode active material layer | | Swelling rate (%) | Retention rate (%) |
|---|---|---|---|---|---|---|---|---|---|---|---|---|
| | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | | |
| 1-73 | 80 | 120 | 19 | 284.1 | 286.9 | 1.010 | 51.5 | 37.0 | 63 | 20.0 | 6.9 | 81 |
| 1-74 | 80 | 120 | 19 | 283.6 | 280.8 | 0.990 | 51.5 | 37.0 | 63 | 20.0 | 7.0 | 84 |
| 1-75 | 80 | 120 | 19 | 284.0 | 280.9 | 0.989 | 51.5 | 37.0 | 63 | 20.0 | 5.0 | 84 |
| 1-76 | 80 | 120 | 19 | 284.9 | 270.7 | 0.950 | 51.5 | 37.0 | 63 | 20.0 | 4.9 | 83 |
| 1-77 | 80 | 120 | 19 | 286.1 | 266.1 | 0.930 | 51.5 | 37.0 | 63 | 20.0 | 5.0 | 82 |
| 1-78 | 80 | 120 | 19 | 286.7 | 263.8 | 0.920 | 51.5 | 37.0 | 63 | 20.0 | 5.8 | 83 |
| 1-79 | 80 | 120 | 20 | 283.9 | 286.7 | 1.010 | 51.5 | 37.0 | 63 | 20.0 | 6.9 | 83 |

TABLE 7-continued (Negative electrode active material: Artificial graphite)

| | Wound electrode body | | | | | | Positive electrode active material layer | | Negative electrode active material layer | | | |
|---|---|---|---|---|---|---|---|---|---|---|---|---|
| Experiment example | Width W (mm) | Height H (mm) | Wound-layer number N | Distance D1 (mm) | Distance D2 (mm) | Distance ratio D2/D1 | Thickness (μm) | Area density (mg/cm²) | Thickness (μm) | Area density (mg/cm²) | Swelling rate (%) | Retention rate (%) |
| 1-80 | 80 | 120 | 20 | 284.9 | 282.1 | 0.990 | 51.5 | 37.0 | 63 | 20.0 | 6.9 | 82 |
| 1-81 | 80 | 120 | 20 | 284.1 | 281.0 | 0.989 | 51.5 | 37.0 | 63 | 20.0 | 7.0 | 83 |
| 1-82 | 80 | 120 | 20 | 285.1 | 270.8 | 0.950 | 51.5 | 37.0 | 63 | 20.0 | 7.1 | 84 |
| 1-83 | 80 | 120 | 20 | 284.9 | 265.0 | 0.930 | 51.5 | 37.0 | 63 | 20.0 | 6.9 | 82 |
| 1-84 | 80 | 120 | 20 | 287.0 | 264.0 | 0.920 | 51.5 | 37.0 | 63 | 20.0 | 6.9 | 81 |

TABLE 8

(Negative electrode active material: Artificial graphite)

| | Wound electrode body | | | | | | Positive electrode active material layer | | Negative electrode active material layer | | | |
|---|---|---|---|---|---|---|---|---|---|---|---|---|
| Experiment example | Width W (mm) | Height H (mm) | Wound-layer number N | Distance D1 (mm) | Distance D2 (mm) | Distance ratio D2/D1 | Thickness (μm) | Area density (mg/cm²) | Thickness (μm) | Area density (mg/cm²) | Swelling rate (%) | Retention rate (%) |
| 1-85 | 200 | 120 | 15 | 282.1 | 284.9 | 1.010 | 51.5 | 37.0 | 63 | 20.0 | 7.0 | 82 |
| 1-86 | 200 | 120 | 15 | 284.0 | 281.2 | 0.990 | 51.5 | 37.0 | 63 | 20.0 | 7.1 | 81 |
| 1-87 | 200 | 120 | 15 | 283.8 | 280.7 | 0.989 | 51.5 | 37.0 | 63 | 20.0 | 5.0 | 83 |
| 1-88 | 200 | 120 | 15 | 285.1 | 270.8 | 0.950 | 51.5 | 37.0 | 63 | 20.0 | 4.9 | 82 |
| 1-89 | 200 | 120 | 15 | 284.9 | 265.0 | 0.930 | 51.5 | 37.0 | 63 | 20.0 | 5.1 | 83 |
| 1-90 | 200 | 120 | 15 | 286.9 | 263.9 | 0.920 | 51.5 | 37.0 | 63 | 20.0 | 5.8 | 84 |
| 1-91 | 200 | 120 | 19 | 283.4 | 286.2 | 1.010 | 51.5 | 37.0 | 63 | 20.0 | 6.9 | 82 |
| 1-92 | 200 | 120 | 19 | 283.3 | 280.5 | 0.990 | 51.5 | 37.0 | 63 | 20.0 | 6.9 | 83 |
| 1-93 | 200 | 120 | 19 | 284.1 | 281.0 | 0.989 | 51.5 | 37.0 | 63 | 20.0 | 5.0 | 83 |
| 1-94 | 200 | 120 | 19 | 285.5 | 271.2 | 0.950 | 51.5 | 37.0 | 63 | 20.0 | 5.0 | 84 |
| 1-95 | 200 | 120 | 19 | 285.7 | 265.7 | 0.930 | 51.5 | 37.0 | 63 | 20.0 | 5.1 | 83 |
| 1-96 | 200 | 120 | 19 | 286.7 | 263.8 | 0.920 | 51.5 | 37.0 | 63 | 20.0 | 5.8 | 82 |

TABLE 9

(Negative electrode active material: Artificial graphite)

| | Wound electrode body | | | | | | Positive electrode active material layer | | Negative electrode active material layer | | | |
|---|---|---|---|---|---|---|---|---|---|---|---|---|
| Experiment example | Width W (mm) | Height H (mm) | Wound-layer number N | Distance D1 (mm) | Distance D2 (mm) | Distance ratio D2/D1 | Thickness (μm) | Area density (mg/cm²) | Thickness (μm) | Area density (mg/cm²) | Swelling rate (%) | Retention rate (%) |
| 1-97 | 30 | 80 | 11 | 283.1 | 285.9 | 1.010 | 51.5 | 37.0 | 63 | 20.0 | 7.0 | 82 |
| 1-98 | 30 | 80 | 11 | 285.5 | 282.6 | 0.990 | 51.5 | 37.0 | 63 | 20.0 | 7.1 | 81 |
| 1-99 | 30 | 80 | 11 | 284.9 | 281.8 | 0.989 | 51.5 | 37.0 | 63 | 20.0 | 5.0 | 84 |
| 1-100 | 30 | 80 | 11 | 286.1 | 271.8 | 0.950 | 51.5 | 37.0 | 63 | 20.0 | 5.1 | 83 |
| 1-101 | 30 | 80 | 11 | 285.7 | 265.7 | 0.930 | 51.5 | 37.0 | 63 | 20.0 | 5.0 | 83 |
| 1-102 | 30 | 80 | 11 | 286.9 | 263.9 | 0.920 | 51.5 | 37.0 | 63 | 20.0 | 5.8 | 83 |
| 1-103 | 30 | 160 | 11 | 284.1 | 286.9 | 1.010 | 51.5 | 37.0 | 63 | 20.0 | 6.9 | 82 |
| 1-104 | 30 | 160 | 11 | 284.4 | 281.6 | 0.990 | 51.5 | 37.0 | 63 | 20.0 | 7.1 | 82 |
| 1-105 | 30 | 160 | 11 | 285.1 | 282.0 | 0.989 | 51.5 | 37.0 | 63 | 20.0 | 5.1 | 82 |
| 1-106 | 30 | 160 | 11 | 286.1 | 271.8 | 0.950 | 51.5 | 37.0 | 63 | 20.0 | 4.9 | 81 |
| 1-107 | 30 | 160 | 11 | 285.6 | 265.6 | 0.930 | 51.5 | 37.0 | 63 | 20.0 | 4.8 | 84 |
| 1-108 | 30 | 160 | 11 | 287.1 | 264.1 | 0.920 | 51.5 | 37.0 | 63 | 20.0 | 5.9 | 83 |

TABLE 10

(Negative electrode active material: Artificial graphite)

| Experiment example | Wound electrode body | | | | | | Positive electrode active material layer | | Negative electrode active material layer | | Swelling rate (%) | Retention rate (%) |
|---|---|---|---|---|---|---|---|---|---|---|---|---|
| | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | | |
| 1-109 | 80 | 80 | 11 | 282.9 | 285.7 | 1.010 | 51.5 | 37.0 | 63 | 20.0 | 7.0 | 81 |
| 1-110 | 80 | 80 | 11 | 285.1 | 282.2 | 0.990 | 51.5 | 37.0 | 63 | 20.0 | 7.0 | 82 |
| 1-111 | 80 | 80 | 11 | 284.9 | 281.8 | 0.989 | 51.5 | 37.0 | 63 | 20.0 | 5.0 | 83 |
| 1-112 | 80 | 80 | 11 | 284.4 | 270.2 | 0.950 | 51.5 | 37.0 | 63 | 20.0 | 5.0 | 82 |
| 1-113 | 80 | 80 | 11 | 285.5 | 265.5 | 0.930 | 51.5 | 37.0 | 63 | 20.0 | 5.1 | 81 |
| 1-114 | 80 | 80 | 11 | 286.7 | 263.8 | 0.920 | 51.5 | 37.0 | 63 | 20.0 | 5.9 | 82 |
| 1-115 | 80 | 160 | 11 | 284.0 | 286.8 | 1.010 | 51.5 | 37.0 | 63 | 20.0 | 6.9 | 83 |
| 1-116 | 80 | 160 | 11 | 283.3 | 280.5 | 0.990 | 51.5 | 37.0 | 63 | 20.0 | 7.0 | 83 |
| 1-117 | 80 | 160 | 11 | 285.1 | 282.0 | 0.989 | 51.5 | 37.0 | 63 | 20.0 | 5.1 | 84 |
| 1-118 | 80 | 160 | 11 | 285.5 | 271.2 | 0.950 | 51.5 | 37.0 | 63 | 20.0 | 5.1 | 82 |
| 1-119 | 80 | 160 | 11 | 284.9 | 265.0 | 0.930 | 51.5 | 37.0 | 63 | 20.0 | 5.0 | 81 |
| 1-120 | 80 | 160 | 11 | 287.0 | 264.0 | 0.920 | 51.5 | 37.0 | 63 | 20.0 | 5.8 | 82 |

TABLE 11

(Negative electrode active material: Artificial graphite)

| Experiment example | Wound electrode body | | | | | | Positive electrode active material layer | | Negative electrode active material layer | | Swelling rate (%) | Retention rate (%) |
|---|---|---|---|---|---|---|---|---|---|---|---|---|
| | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | | |
| 1-121 | 30 | 120 | 11 | 309.7 | 312.8 | 1.010 | 57.5 | 40.0 | 70 | 21.6 | 6.9 | 82 |
| 1-122 | 30 | 120 | 11 | 311.0 | 307.9 | 0.990 | 57.5 | 40.0 | 70 | 21.6 | 6.9 | 81 |
| 1-123 | 30 | 120 | 11 | 310.8 | 307.4 | 0.989 | 57.5 | 40.0 | 70 | 21.6 | 5.0 | 81 |
| 1-124 | 30 | 120 | 11 | 312.4 | 296.8 | 0.950 | 57.5 | 40.0 | 70 | 21.6 | 5.0 | 83 |
| 1-125 | 30 | 120 | 11 | 315.7 | 293.6 | 0.930 | 57.5 | 40.0 | 70 | 21.6 | 5.1 | 84 |
| 1-126 | 30 | 120 | 11 | 316.4 | 291.1 | 0.920 | 57.5 | 40.0 | 70 | 21.6 | 6.0 | 84 |
| 1-127 | 30 | 120 | 11 | 237.8 | 240.2 | 1.010 | 43 | 30.0 | 51 | 16.2 | 6.9 | 82 |
| 1-128 | 30 | 120 | 11 | 239.9 | 237.5 | 0.990 | 43 | 30.0 | 51 | 16.2 | 7.1 | 82 |
| 1-129 | 30 | 120 | 11 | 240.1 | 237.5 | 0.989 | 43 | 30.0 | 51 | 16.2 | 5.1 | 83 |
| 1-130 | 30 | 120 | 11 | 242.5 | 230.4 | 0.950 | 43 | 30.0 | 51 | 16.2 | 5.1 | 83 |
| 1-131 | 30 | 120 | 11 | 244.8 | 227.7 | 0.930 | 43 | 30.0 | 51 | 16.2 | 5.0 | 81 |
| 1-132 | 30 | 120 | 11 | 245.8 | 226.1 | 0.920 | 43 | 30.0 | 51 | 16.2 | 6.0 | 82 |

As described in Tables 1 to 11, the swelling characteristic and the cyclability characteristic varied greatly depending on the configuration of the wound electrode body 100, i.e., the width W, the wound-layer number N, and the distance ratio D2/D1.

As described in Tables 1 to 7 (Experiment examples 1-1 to 1-84), specifically, in a case where the width W, the wound-layer number N, and the distance ratio D2/D1 satisfied Condition A (in which: the width W was equal to or greater than 30 mm and equal to or less than 160 mm; the wound-layer number N was equal to or greater than 8 and equal to or less than 19; and the distance ratio D2/D1 was equal to or less than 0.989), the swelling rate was decreased while the high retention rate was maintained, compared with those in a case where Condition A was not satisfied.

As described in Table 8 (Experiment examples 1-85 to 1-96), in a case where the width W, the wound-layer number N, and the distance ratio D2/D1 satisfied Condition B (in which: the width W was greater than 160 μm; the wound-layer number N was equal to or greater than 15; and the distance ratio D2/D1 was equal to or less than 0.989), the swelling rate was decreased while the high retention rate was maintained, compared with those in a case where Condition B was not satisfied.

In particular, in the case where Condition A was satisfied, the swelling rate was further decreased if the distance ratio D2/D1 was equal to or greater than 0.930.

In the case where Condition B was satisfied, the swelling rate was also further decreased if the distance ratio D2/D1 was equal to or greater than 0.930.

Other than the above, in the case where Condition A was satisfied, similar tendencies were obtained even if the height H was changed as described in Tables 9 and 10 (Experiment examples 1-97 to 1-120), and similar tendencies were also obtained even if the configuration (the thickness and the area density) of each of the positive electrode active material layer 12 and the negative electrode active material layer 22 was changed as described in Table 11 (Experiment examples 1-121 to 1-132).

Experiment Examples 2-1 to 2-6

As described in Table 12, in accordance with a similar procedure except that natural graphite was used in place of the artificial graphite as the negative electrode active material (the carbon material), the secondary batteries were fabricated and then the battery characteristics (the swelling characteristic and the cyclability characteristic) thereof were examined.

TABLE 12

(Negative electrode active material: Natural graphite)

| | | | Wound electrode body | | | Positive electrode active material layer | | Negative electrode active material layer | | | |
|---|---|---|---|---|---|---|---|---|---|---|---|
| Experiment example | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | Swelling rate (%) | Retention rate (%) |
| 2-1 | 80 | 120 | 11 | 283.1 | 285.9 | 1.010 | 51.5 | 37.0 | 63 | 20.0 | 6.9 | 82 |
| 2-2 | 80 | 120 | 11 | 283.3 | 280.5 | 0.990 | 51.5 | 37.0 | 63 | 20.0 | 6.9 | 82 |
| 2-3 | 80 | 120 | 11 | 285.5 | 282.4 | 0.989 | 51.5 | 37.0 | 63 | 20.0 | 5.1 | 81 |
| 2-4 | 80 | 120 | 11 | 284.1 | 269.9 | 0.950 | 51.5 | 37.0 | 63 | 20.0 | 5.1 | 81 |
| 2-5 | 80 | 120 | 11 | 285.5 | 265.5 | 0.930 | 51.5 | 37.0 | 63 | 20.0 | 5.0 | 81 |
| 2-6 | 80 | 120 | 11 | 286.7 | 263.8 | 0.920 | 51.5 | 37.0 | 63 | 20.0 | 5.9 | 82 |

In the case (Table 12) where the carbon material used as the negative electrode active material was natural graphite, tendencies were obtained similar to those in the case (Tables 1 to 11) where the carbon material used as the negative electrode active material was artificial graphite. That is, in the case where the width W, the wound-layer number N, and the distance ratio D2/D1 satisfied Condition A, the swelling rate was decreased while the high retention rate was maintained, compared with those in the case where Condition A was not satisfied. Further, the swelling rate was further decreased if the distance ratio D2/D1 was equal to or greater than 0.930.

Experiment Examples 3-1 to 3-6

As described in Table 13, in accordance with a similar procedure except that a mixture of the carbon material (artificial graphite) and the metal-based material (silicon oxide (SiO)) was used in place of the carbon material (artificial graphite) as the negative electrode active material, the secondary batteries were fabricated and then the battery characteristics (the swelling characteristic and the cyclability characteristic) of the fabricated secondary batteries were examined. In this case, a ratio of the metal-based material in the negative electrode active material (the mixture of the carbon material and the metal-based material) was 5 wt %.

In the case (Table 13) where the mixture of the carbon material (artificial graphite) and the metal-based material (silicon oxide) was used as the negative electrode active material, tendencies were also obtained similar to those in the case (Tables 1 to 11) where the carbon material (artificial graphite) was used as the negative electrode active material. That is, in the case where the width W, the wound-layer number N, and the distance ratio D2/D1 satisfied Condition A, the swelling rate was decreased while the high retention rate was maintained, compared with those in the case where Condition A was not satisfied. Further, the swelling rate was further decreased if the distance ratio D2/D1 was equal to or greater than 0.930.

Experiment Examples 4-1 to 4-6

As described in Table 14, in accordance with a similar procedure except that a mixture of the carbon material (natural graphite) and the metal-based material (silicon oxide) was used in place of the carbon material (artificial graphite) as the negative electrode active material, the secondary batteries were fabricated and then the battery characteristics (the swelling characteristic and the cyclability characteristic) of the fabricated secondary batteries were examined. In this case, the ratio of the metal-based material in the negative electrode active material (the mixture of the carbon material and the metal-based material) was 5 wt %.

TABLE 13

(Negative electrode active material: Artificial graphite + Silicon oxide)

| | | | Wound electrode body | | | Positive electrode active material layer | | Negative electrode active material layer | | | |
|---|---|---|---|---|---|---|---|---|---|---|---|
| Experiment example | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | Swelling rate (%) | Retention rate (%) |
| 3-1 | 80 | 120 | 11 | 282.9 | 285.7 | 1.010 | 51.5 | 37.0 | 63 | 20.0 | 8.0 | 81 |
| 3-2 | 80 | 120 | 11 | 284.1 | 281.3 | 0.990 | 51.5 | 37.0 | 63 | 20.0 | 7.8 | 82 |
| 3-3 | 80 | 120 | 11 | 283.6 | 280.5 | 0.989 | 51.5 | 37.0 | 63 | 20.0 | 6.0 | 83 |
| 3-4 | 80 | 120 | 11 | 285.5 | 271.2 | 0.950 | 51.5 | 37.0 | 63 | 20.0 | 6.0 | 84 |
| 3-5 | 80 | 120 | 11 | 285.4 | 265.4 | 0.930 | 51.5 | 37.0 | 63 | 20.0 | 5.9 | 83 |
| 3-6 | 80 | 120 | 11 | 286.7 | 263.8 | 0.920 | 51.5 | 37.0 | 63 | 20.0 | 6.9 | 82 |

TABLE 14

(Negative electrode active material: Natural graphite + Silicon oxide)

| Experiment example | Wound electrode body | | | | | | Positive electrode active material layer | | Negative electrode active material layer | | Swelling rate (%) | Retention rate (%) |
|---|---|---|---|---|---|---|---|---|---|---|---|---|
| | Width W (mm) | Height H (mm) | Wound-layer number N | Distance D1 (mm) | Distance D2 (mm) | Distance ratio D2/D1 | Thickness (μm) | Area density (mg/cm$^2$) | Thickness (μm) | Area density (mg/cm$^2$) | | |
| 4-1 | 80 | 120 | 11 | 282.9 | 285.7 | 1.010 | 51.5 | 37.0 | 63 | 20.0 | 7.8 | 83 |
| 4-2 | 80 | 120 | 11 | 285.1 | 282.2 | 0.990 | 51.5 | 37.0 | 63 | 20.0 | 7.8 | 83 |
| 4-3 | 80 | 120 | 11 | 283.3 | 280.2 | 0.989 | 51.5 | 37.0 | 63 | 20.0 | 6.0 | 82 |
| 4-4 | 80 | 120 | 11 | 284.4 | 270.2 | 0.950 | 51.5 | 37.0 | 63 | 20.0 | 5.9 | 81 |
| 4-5 | 80 | 120 | 11 | 285.1 | 265.1 | 0.930 | 51.5 | 37.0 | 63 | 20.0 | 6.1 | 83 |
| 4-6 | 80 | 120 | 11 | 286.6 | 263.7 | 0.920 | 51.5 | 37.0 | 63 | 20.0 | 6.9 | 83 |

In the case (Table 14) where the mixture of the carbon material (natural graphite) and the metal-based material (silicon oxide) was used as the negative electrode active material, tendencies were also obtained similar to those in the case (Tables 1 to 11) where the carbon material (artificial graphite) was used as the negative electrode active material. That is, in the case where the width W, the wound-layer number N, and the ratio D2/D1 satisfied Condition A, the swelling rate was decreased while the high retention rate was maintained, compared with those in the case where Condition A was not satisfied. Further, the swelling rate was further decreased if the distance ratio D2/D1 was equal to or greater than 0.930.

Based upon the results described in Tables 1 to 14, in the case where the wound electrode body 100 having the elongated section perpendicular to the winding axis J involved the width W, the wound-layer number N, and the distance ratio D2/D1 that satisfied Condition A or Condition B, the swelling characteristic was improved while the cyclability characteristic was secured. Accordingly, superior battery characteristics of the secondary batteries were obtained.

Although the technology has been described above with reference to some embodiments and Examples, embodiments of the technology are not limited to those described with reference to the embodiments and the Examples above, and are therefore modifiable in a variety of ways.

Specifically, although the description has been given of the case where the secondary battery of the technology is the laminated secondary battery, this is non-limiting. For example, the secondary battery of the technology may be of any other type such as a prismatic type that easily swells as with the laminated secondary battery.

Moreover, although the description has been given of the case where the secondary battery of the technology is the lithium-ion secondary battery that uses lithium as the electrode reactant, this is non-limiting. For example, the secondary battery of the technology may be any other secondary battery that uses a substance other than lithium as the electrode reactant.

The effects described herein are mere examples, and effects of the technology are therefore not limited to those described herein. Accordingly, the technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising
a wound electrode body including a positive electrode, a negative electrode, and a separator, the positive electrode and the negative electrode being stacked on each other with the separator interposed therebetween and being wound with respect to a winding axis, wherein
the wound electrode body has a section perpendicular to the winding axis, the section having an elongated shape that includes a flat part and a pair of curved parts, the curved parts opposing each other with the flat part interposed therebetween,
the negative electrode includes a negative electrode current collector and a negative electrode active material layer provided on the negative electrode current collector, and
a width of the wound electrode body, a wound-layer number of the wound electrode body, and a ratio of a second distance to a first distance satisfy a Condition A,
wherein the first distance is a distance from one to another of two mutually adjacent parts of the negative electrode current collector in the flat part, and the second distance is a distance from one to another of two mutually adjacent parts of the negative electrode current collector in the curved parts,
wherein the Condition A includes:
the width of the wound electrode body is from 30 millimeters to 160 millimeters;
the wound-layer number of the wound electrode body is from 8 to 19; and
the ratio of the second distance to the first distance is from 0.930 to 0.989.

2. The secondary battery according to claim 1, wherein the negative electrode includes natural graphite, artificial graphite, or both.

3. The secondary battery according to claim 2, wherein the negative electrode further includes one or more materials among a simple substance of silicon, a silicon alloy, and a silicon compound.

4. A battery pack comprising:
the secondary battery according to claim 1;
a controller that controls operation of the secondary battery; and
a switch unit that switches the operation of the secondary battery in accordance with an instruction from the controller.

5. An electric vehicle comprising:
the secondary battery according to claim 1;
a converter that converts electric power supplied from the secondary battery into driving force;
a drive unit that performs driving in accordance with the driving force; and
a controller that controls operation of the secondary battery.

6. An electric power storage system comprising:
the secondary battery according to claim 1;
one or more electric apparatuses that each receive electric power from the secondary battery; and
a controller that controls supply of the electric power from the secondary battery to the one or more electric apparatuses.

7. An electric power tool comprising:
the secondary battery according to claim 1; and
a movable unit that receives electric power from the secondary battery.

8. An electronic apparatus comprising the secondary battery according to claim 1 as an electric power supply source.

9. A secondary battery comprising:
a wound electrode body including a positive electrode, a negative electrode, and a separator, the positive electrode and the negative electrode being stacked on each other with the separator interposed therebetween and being wound with respect to a winding axis, wherein
the wound electrode body has a section perpendicular to the winding axis, the section having an elongated shape that includes a flat part and a pair of curved parts, the curved parts opposing each other with the flat part interposed therebetween,
the negative electrode includes a negative electrode current collector and a negative electrode active material layer provided on the negative electrode current collector, and
a width of the wound electrode body, a wound-layer number of the wound electrode body, and a ratio of a second distance to a first distance satisfy a Condition B,
wherein the first distance is a distance from one to another of two mutually adjacent parts of the negative electrode current collector in the flat part, and the second distance is a distance from one to another of two mutually adjacent parts of the negative electrode current collector in the curved parts,
wherein the Condition B includes:
the width of the wound electrode body is greater than 160 millimeters;
the wound layer number of the wound electrode body is equal to or greater than 15; and
the ratio of the second distance to the first distance is from 0.930 to 0.989.

10. The secondary battery according to claim 9, wherein the negative electrode includes natural graphite, artificial graphite, or both.

11. The secondary battery according to claim 10, wherein the negative electrode further includes one or more materials among a simple substance of silicon, a silicon alloy, and a silicon compound.

12. A battery pack comprising:
the secondary battery according to claim 9;
a controller that controls operation of the secondary battery; and
a switch unit that switches the operation of the secondary battery in accordance with an instruction from the controller.

13. An electric vehicle comprising:
the secondary battery according to claim 9;
a converter that converts electric power supplied from the secondary battery into driving force;
a drive unit that performs driving in accordance with the driving force; and
a controller that controls operation of the secondary battery.

14. An electric power storage system comprising:
the secondary battery according to claim 9;
one or more electric apparatuses that each receive electric power from the secondary battery; and
a controller that controls supply of the electric power from the secondary battery to the one or more electric apparatuses.

15. An electric power tool comprising:
the secondary battery according to claim 9; and
a movable unit that receives electric power from the secondary battery.

16. An electronic apparatus comprising the secondary battery according to claim 10 as an electric power supply source.

17. The secondary battery according to claim 9, wherein the width of the wound electrode body is greater than 160 millimeters to 200 millimeters, and wherein the wound layer number of the wound electrode body is from 15 to 19.

* * * * *